US012449767B2

(12) United States Patent
Smeeton et al.

(10) Patent No.: US 12,449,767 B2
(45) Date of Patent: Oct. 21, 2025

(54) HOLOGRAM CALCULATION

(71) Applicant: Envisics Ltd, Milton Keynes (GB)

(72) Inventors: Timothy Smeeton, Milton Keynes (GB); Jamieson Christmas, Milton Keynes (GB); Daniel Burnham, Milton Keynes (GB); Ruisheng Lin, Milton Keynes (GB); Gavin Fowler, Milton Keynes (GB)

(73) Assignee: Envisics Ltd., Milton Keynes (GB)

( * ) Notice: Subject to any disclaimer, the term of this patent is extended or adjusted under 35 U.S.C. 154(b) by 464 days.

(21) Appl. No.: 17/859,413

(22) Filed: Jul. 7, 2022

(65) Prior Publication Data

US 2023/0060564 A1 Mar. 2, 2023

(30) Foreign Application Priority Data

Aug. 26, 2021 (GB) ...................................... 2112216

(51) Int. Cl.
 G03H 1/26 (2006.01)
(52) U.S. Cl.
 CPC ......... *G03H 1/26* (2013.01); *G03H 2001/262* (2013.01); *G03H 2222/13* (2013.01); *G03H 2223/16* (2013.01); *G03H 2226/02* (2013.01)
(58) Field of Classification Search
 CPC ............... G03H 1/26; G03H 2001/262; G03H 2222/13; G03H 2223/16; G03H 2226/02
 USPC ........................................ 359/9, 15; 348/148
 See application file for complete search history.

(56) References Cited

U.S. PATENT DOCUMENTS

| 2006/0139711 | A1* | 6/2006 | Leister | G03H 1/2294 |
| | | | | 359/9 |
| 2012/0224062 | A1* | 9/2012 | Lacoste | G09G 5/14 |
| | | | | 348/148 |
| 2021/0165212 | A1* | 6/2021 | Christmas | G03H 1/2249 |

FOREIGN PATENT DOCUMENTS

| GB | 2 589 583 A | 6/2021 |
| KR | 10-2018-0079185 | 7/2018 |
| KR | 10-2019-0088609 A | 7/2019 |
| KR | 10-2021-0003853 A | 1/2021 |
| KR | 10-2021-0068983 A | 6/2021 |

OTHER PUBLICATIONS

Combined Search and Examination Report issued in GB 2112216.3 (Apr. 12, 2022) (10 pages).
Office Action issued on Feb. 20, 2024 in Korean Application KR 10-2022-0107684 (6 pages).
(Continued)

*Primary Examiner* — Audrey Y Chang
(74) *Attorney, Agent, or Firm* — Akerman LLP

(57) ABSTRACT

Systems and method disclosed herein include, among other features, receiving an image for display within a display area of a display system, determining a first image component of the image, calculating a hologram of the image, displaying the hologram on a display device and spatially modulating light in accordance with the displayed hologram, and propagating the spatially modulated light through a pupil expander arranged to provide a plurality of different light propagation paths for the spatially modulated light from the display device to the viewing area, wherein each light propagation path corresponds to a respective continuous region of the image owing to the angular distribution of light from the hologram.

15 Claims, 17 Drawing Sheets

(56) References Cited

OTHER PUBLICATIONS

English translation of Office Action issued on Feb. 20, 2024 in Korean Application KR 10-2022-0107684 (6 pages).
Examination Report issued on Mar. 5, 2025 in EPO Application 22188932.2 (7 pages).
Chang, Chenliang et al., "Foveated holograph near-eye 3D display," Optics Express, vol. 28, No. 2, pp. 1345-1356 (Jan. 20, 2020) (12 pages).

* cited by examiner

HOLOGRAM CALCULATION

CROSS-REFERENCE TO RELATED APPLICATIONS

This application claims priority under 35 U.S.C. § 119 to GB 2112216.3, titled "Hologram Calculation," filed on Aug. 26, 2021. The entire contents of GB 2112216.3 are incorporated by reference herein for all purposes.

FIELD

The present disclosure relates to image projection and a method of projecting an image. The present disclosure relates to image reconstruction and a method of reconstructing an image from a diffractive structure such as a hologram or kinoform. Embodiments relate to projecting an image through a pupil expander such as a waveguide pupil expander. The present disclosure also relates to a method of optimising the allocation of data processing resources such as hologram compute resources. Some embodiments relate to a light engine such as an image projector or holographic projector or picture generating unit. Some embodiments relate to a head-up display or a vehicle housing the head-up display.

INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e., is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and light detection and ranging, "LiDAR", for example.

SUMMARY

The present disclosure and drawings generally show one-dimensional cases for ease of explanation and illustration. However, the person skilled in the art of optics will appreciate that the concepts described and shown may extend in two-dimensions to provide two-dimensional images from two-dimensional holograms. For example, whilst only one-dimensional pupil expansion may be described and shown, the reader should appreciate that the present disclosure extends to two-dimensional pupil expansion—e.g., using two one-dimensional pupil expanders in series.

Broadly, the present disclosure relates to image projection. It relates to a method of image projection and an image projector which comprises a display device. The present disclosure also relates to a projection system comprising the image projector and a viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image/display plane. The image is formed by illuminating a diffractive pattern (e.g., hologram) displayed on the display device.

The display device comprises pixels. The pixels of the display device diffract light. In accordance with well-understood optics, the magnitude of the maximum diffraction angle is determined by the size of the pixels (and other factors such as the wavelength of the light).

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In embodiments, the image is a real image. In other embodiments, the image is a virtual image that is perceived by a human eye (or eyes). The projection system, or light engine, may thus be configured so that the viewer looks directly at the display device. In such embodiments, light encoded with the hologram is propagated directly to the eye(s) and there is no intermediate holographic reconstruction formed, either in free space or on a screen or other light receiving surface, between the display device and the viewer. In such embodiments, the pupil of the eye may be regarded as being the entrance aperture of the viewing system and the retina of the eye may be regarded as the viewing plane of the viewing system. It is sometimes said that, in this configuration, the lens of the eye performs a hologram-to-image conversion or transform.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-motion box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the field of view—i.e., how to increase the range of angles of light rays that are propagated from the display device, and which can successfully propagate through an eye's pupil to form an image. The display device is (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels). The present disclosure relates to so-called direct view holography in which a hologram of an image is propagated to the human eye rather than the image itself. In other words, the light received by the viewer is modulated according to a hologram of the image.

The pupil expander increases the field of view and therefore increase the maximum propagation distance over which the full diffractive angle of the display device may be used. Use of a pupil expander can also increase the user's eye-box laterally, thus enabling some movement of the eye/s to occur, whilst still enabling the user to see the image. In embodiments, the pupil expander is a waveguide pupil expander. The present disclosure generally relates to non-infinite virtual image distances—that is, near-field virtual images.

There is disclosed herein a method of calculating a hologram of an image, the method comprising at least one step including cropping in accordance with the entrance pupil of the viewing system to form a hologram that, when illuminated, forms spatially modulated light, wherein continuous light channels of the spatially modulated light correspond with continuous regions of the image. A continuous light channel may be defined by a continuous range of light ray angles of the spatially modulated light. All continuous light channels of the spatially modulated light correspond with a continuous region of the image. The spatially modulated light may be divided into any number of continuous light channels. In other words, the method disclosed herein determines a diffractive structure arranged to spatially modulate light transformable by a viewing system into an image, wherein the diffractive structure is configured to route light into a plurality of hologram channels, each hologram channel corresponding to a different part of the image.

In some cases, this method of hologram compute for an optical system including a waveguide pupil expander can utilize eye tracking to determine the position of the pupil of the eye(s). The hologram is computed to provide a good image across the field of view when viewed from the eye's pupil position. Eye tracking tools determine the position of the pupil of the eye(s) and may also estimate the gaze direction of the eye (i.e., the direction that the eye is pointing towards). Some foveal imaging concepts provide higher image quality to the foveal region than to the remainder of the field of view. However, the present disclosure relates to much more than that. The present disclosure relates to managing hologram compute resource, in a general sense, using foveal imaging concepts.

More specifically, the hologram compute resource dedicated to different regions in the field of view is selected according to the gaze tracking input, and the hologram is propagated through a pupil expander wherein different regions of the field of view correspond to different optical paths through the pupil expander which are effectively different sub-holograms.

Aspects of the present disclosure are defined in the appended independent claims.

A first aspect of the present disclosure is a method of reconstructing an image from a hologram. The method comprises first to fifth steps. The first to fifth steps may be performed in order. The first step comprises receiving an image for display within a display area of a display system, such as a head-up display. The display area is viewable or visible from a viewing area spatially separated therefrom. That is, the viewing area is spatially separated from the display area—e.g., by 1-2 meters. In some examples, the display area may be the active display area of a display device such as a spatial light modulator that is viewable from the viewing area. In other examples, the display area may comprise a virtual display area formed from one more virtual image/display planes that is viewable from the viewing area. The viewing area may be a viewing window such as an eye-box of a head-up display. The second step comprises determining a first image component of the image. The third step comprises determining or calculating a hologram of the image. The hologram is configured to angularly distribute light in accordance with position within the image such that angular channels of angularly distributed light correspond with respective continuous regions of the image. The fourth step comprises displaying the hologram on the display device and spatially modulating light in accordance with the displayed hologram. The fifth step comprises propagating each spatially modulated light through a pupil expander arranged to provide a plurality of different light propagation paths for the spatially modulated light from the display device to the viewing area. Each light propagation path corresponds to a respective continuous region of the image owing to the angular distribution of light from the hologram. The fifth step may be achieved by arranging the pupil expander to receive the spatially modulated light from the display device. Notably, the method (e.g., the third step) comprises allocating more data processing resources to calculation of the hologram with respect to the first image component than a second image component of the image.

The reader will be familiar with the idea that, in a real-world holographic display device, infinite time and infinite processing power cannot be allocated to calculation of the hologram. For example, if the holographic display device is required to operate at video-rate, it may be necessary to calculate each hologram from each corresponding image frame at a rate faster than the frame/display/video rate of an incoming stream of images. Likewise, if the holographic display device is required to satisfy a maximum size or maximum cost constraint, it may be necessary to use lower specification electronic components such as processors or memory. In a real-world device, a finite amount or quantum of data processing resources is therefore available for calculation of each hologram. The term "data processing resources" includes processing time and processing power by way of example only but the reader will be familiar with the idea that a maximum amount or quantum or quantity of data processing can be made available (i.e., allocated) for hologram calculation. These data processing resources—in whatever form they take—are typically allocated evenly during hologram calculation. In fact, it is usually impossible to allocate hologram compute resources in any other way because each part of a hologram contributes to every part of the reconstruction. That is, there is not a one-to-one pixel correlation between the hologram and reconstructed image. In embodiments, the quality or faithfulness of a hologram to the image it represents is dependent on the amount of data processing resource allocated to calculation. That is, if more data processing resource is allocated to calculation of the hologram, the hologram will produce a higher quality reconstruction of the image. In other words, the difference between the source/target image and the holographically-reconstructed image is reduced. It is generally desirable to allocate as much data processing resource as possible to calculation of each hologram but, in accordance with this disclosure, data processing resources are unevenly allocated to each image owing to the nature of the hologram and the use of a waveguide pupil expander. For example, some aspects or components (e.g., sub-areas or color components) of each image are allocated or assigned or apportioned more hologram compute resources than other aspects or components of the same image. This will be understood further from the detailed description that follows.

In overview, the method in accordance with the present disclosure results in high image quality being perceived by the user but with a lower hologram compute resource requirement. Furthermore, there is a very good fit with the hologram compute methods used for the optical system described, and use is made of a system which already has eye tracking integrated into the hologram compute.

Importantly, the hologram is propagated to the viewing system/s not a holographic reconstruction (i.e., image) formed from the hologram. It may be said that the spatially modulated light received by the viewing system/s is in the hologram domain rather than the spatial or image domain. It may also be said that the viewing system/s performs the hologram to image transform. More specifically, an optical element such as lens of each viewing system performs the transformation. In embodiments, a holographic reconstruction or image is not formed between the display device and viewing system/s. In some embodiments, a different hologram is calculated and propagated to each eye of a viewer, optionally, using an interlacing scheme.

The display device has an active/pixel display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

The methods disclosed herein form a hologram configured to route light into a plurality of channels, each channel corresponding to a different part (i.e., sub-area) of an image. The hologram may be represented, such as displayed, on a display device such as a spatial light modulator. When displayed on an appropriate display device, the hologram may spatially modulate light transformable by a viewing system into the image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram is described herein as routing light into a plurality of hologram channels merely to reflect that the image reconstructable from the hologram has a finite size and can be arbitrarily divided into a plurality of image sub-areas, wherein each hologram channel would correspond to each image sub-area. Importantly, the hologram of this disclosure is characterised by how it distributes the image content when illuminated. Specifically, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be arbitrarily divided into a plurality of hologram channels, wherein each hologram channel is defined by a range of light ray angles (in two-dimensions). It will be understood from the foregoing that any hologram channel (i.e., sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels. However, in some embodiments, a plurality of spatially separated hologram channels is formed by intentionally leaving areas of the target image, from which the hologram is calculated, blank or empty (i.e., no image content is present). In some embodiments, the light channels are non-overlapping. In other embodiments—for example, those additionally including an optical combiner having optical power (e.g., vehicle windscreen) between the waveguide and viewer—some light channels may at least partially overlap.

Nevertheless, the hologram may still be identified. For example, if only a continuous part of sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e., is substantially the same as) the shape of the entrance pupil although the size may be different. Each light hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram, and the appended claims are set out accordingly.

The different propagation paths may pass through the entrance aperture of the viewing system at a different angle. The pupil expander may be arranged so that all hologram channels are routed through the entrance aperture of the viewing system at any viewing position on a viewing plane. The pupil expander only routes each hologram channel via one propagation path to the viewing system for each permitted viewing position. At least two hologram channels of the plurality of hologram channels may be partially overlapping at the entrance aperture of the viewing system.

The image comprises a plurality of image components. In other words, the image may be decomposed into a plurality of image components. The term "image component" is used to encompass a number of different concepts disclosed herein. The image component may take different forms. Each image component may be a sub-area of the image. That is, a region or part of the image, wherein collectively the different regions or parts of the image make up the full image. By way of example only, a first image component may comprise one half of the image and the second image component may comprise the other half. The plurality of image components may be non-overlapping. In some embodiments, the first image component may correspond to a first sub-area of the image and the second image component may correspond a second sub-area of the image, wherein the first sub-area is different to the second sub-area and, optionally, the first sub-area and second sub-area are non-overlapping. In some embodiments, the first sub-area corresponds to a first contiguous set of image pixels of the image and the second sub-area corresponds to a second contiguous set of image pixels of the image. In some embodiments, the second contiguous set of image pixels partially or fully surround the first contiguous set of image pixels. In some embodiments, the first contiguous set of image pixels comprises fewer image pixels than the second contiguous set of image pixels. In some other embodiments, the distribution of image pixels between the first set and second set is repeatedly or continually changing based on an input. The input may be indicative of a pupil position of the viewer. The input may alternatively be indicative of a property or feature of the image.

Calculation of the hologram may comprise calculating a plurality of sub-holograms. Each sub-hologram may correspond to a different region of the image. Allocating more data processing resources in relation to the first image component than the second image component may comprise allocating more data processing resources in relation to calculation of a first sub-hologram corresponding to the first sub-area than a second sub-hologram corresponding to the second sub-area.

Notably, the inventors have identified a synergy between the characteristic hologram and pupil expander described herein, and user-tracking (e.g., eye-tracking) that enables compute resources related to calculation of the hologram to be optimized. Because each sub-hologram corresponds to a different part of the image and each sub-hologram is calculated at least semi-independently, the inventors recognized that they could spend more or less time on some sub-holograms relative to others based on the visual significance of the corresponding region (i.e., sub-area) of the image. That is, a low quality hologram may be suitable for unimportant areas of the image but high quality holograms in other areas would lead to an overall improvement in the perceived "quality" of the reconstructed image. Disclosure herein related to a quantity or quantum or amount of "data processing resources" for hologram calculation may refer to processing power or time or the like. For example, low quality holograms could be calculated very rapidly, whereas higher quality (or more accurate) holograms might require more processing time. In fact, in accordance with the present disclosure, each sub-hologram may be calculated to a different level of accuracy. In some embodiments, a finite amount of time or a finite quantum of data processing resources is available for hologram calculation and more time is spent determining or calculating at least one sub-hologram than at least one other sub-hologram. The reader will therefore understand that some embodiments relate to the allocation or e.g., continual reallocation/distribution of processing resources within some boundaries (e.g., of time or processing power) set by a real-world application or system. In some embodiments, the distribution of processing resources between the sub-holograms is continually evaluated—e.g., evaluated at least once per frame of a video rate sequence of image frames. Again, the inventors have identified a unique synergy between different aspects of the disclosed holographic system that enable precious resources related to calculation of a hologram—e.g., in real-time—to be optimized to provide an improved visual experience for the user.

The hologram may be a point cloud hologram and allocating more data processing resources in relation to the first sub-area than the second sub-area may comprise using a higher density of point cloud data points in relation to the first sub-area than the second sub-area.

Calculating the hologram may comprise executing an iterative algorithm and allocating more data processing resources in relation to the first sub-area may comprise performing more iterations of the algorithm in relation to the first sub-area than the second sub-area of the image.

The inventors identified yet further favorable synergy with the use of an iterative phase retrieval algorithm such as that described herein with reference to FIGS. 7 and 8. In the algorithm described, each sub-hologram is calculated independently—at least, to some extent—and the number of iterations used for each sub-hologram can therefore be independently determined. Whilst a degree of convergence is found in practice, the more iterations used, the more accurate the phase retrieval/sub-hologram should be and therefore the higher quality the reconstructed image. Therefore, in one example, a first sub-hologram relating to an area of the image having a relatively low visual impact/importance is determined using x iterations of the algorithm and a second sub-hologram relating to an area of the image having a relatively high visual impact/importance is determined using y iterations, wherein y>x. In some examples, an area associated with the foveal viewing area of the viewer is allocated more processing resource (e.g., algorithm iterations) than a peripheral viewing area of the viewer. Again, the inventors have identified and utilized a unique synergy with the particular type of hologram disclosed herein—namely, one that channels light, in the hologram domain, in correspondence with image position.

The method may comprise first to fifth stages. The first stage comprises determining a first complex light field at an entrance pupil of the viewing system. The first complex light field results from the propagation of light from a display plane of the display device along at least one light propagation path of the pupil expander. The first stage also comprises cropping in accordance with the entrance pupil of the viewing system. The second stage comprises determining a second complex light field at a sensor plane of a sensor of the viewing system. The second complex light field results from the propagation of light of the first complex light field from the entrance pupil through a lens of the viewing system. The second stage also comprises modifying the amplitude component in accordance with the image. The third stage comprises determining a third complex light field at the entrance pupil. The third complex light field results from the reverse propagation of light of the second complex light field from the sensor plane back through the lens. The third stage also comprises cropping in accordance with the entrance pupil. The fourth stage comprises determining a fourth complex light field at the display plane. The fourth complex light field results from the propagation of light of the third complex light field back along the at least one light propagation of the pupil expander. The fourth stage also comprises cropping in accordance with the display device. The hologram is extracted from the fourth complex light field. The first to fourth steps may be iteratively repeated. The hologram converges, and likely improves, with each iteration but does plateau. The method may stop when the hologram extractable from the fourth stage is deemed of acceptable quality or the rate of change with each iteration is below a threshold value or an allotted time has expired, for example. For the avoidance of doubt, the hologram that is extracted is the hologram for display on the display device.

The term "reverse propagation" is merely used to reflect that the propagation direction of light in the third and fourth stages is different or substantially opposite to that in the first and second stages. In this respect, the light propagation in the first and second stages may be termed "forward propagation". In some embodiments, the "forward propagation" and "reverse propagation" are a mathematical inverse of each other.

The term "cropping" is used herein to refer to a process of selectively discarding information, such as light field information, outside an area or region of interest, such as outside a light aperture. In some embodiments, "cropping" is a data processing step comprises discarding data points, or zeroing data points or simply ignoring data points, outside the aperture.

Reference is made herein to a "complex light field". The term "light field" merely indicates a pattern of light having a finite size in at least two orthogonal spatial directions, x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field. In accordance with the method disclosed herein, the complex light field is propagated forward and back in the +z and −z directions between a hologram plane (in the hologram/frequency/Fourier domain) and an image plane (in the image/spatial domain). Light propagation can be simulated or modelled using any one of a number of different approaches or mathematical transforms familiar to the person skilled in the art of wave optics.

The at least one light propagation path may be only one of the plurality of light propagation paths provided by the pupil expander. The first to fourth stages may be carried out for each light propagation path of the plurality of light propagation paths in order to extract a sub-hologram for each light propagation path. The plurality of sub-holograms corresponding to the plurality of light propagation paths are combined in order to form the hologram for display on the display device.

The first to fourth stages may be iteratively repeated for each light propagation path before the step of extracting the sub-hologram from the final iteration.

The first sub-hologram corresponding to the first sub-area may be calculated by a point cloud method/algorithm. Additionally, or alternatively, the second sub-hologram corresponding to the second sub-area may calculated using an iterative method/algorithm such as a phase retrieval method/algorithm.

The method may be repeated if a change regarding the size and/or position within the image of the first sub-area is determined.

The method may further comprise recalculating the hologram with respect to the first image component, but not second image component, if a change regarding the size and/or position within the image of the first sub-area is determined. In these embodiments, it is not always necessary to recompute the second sub-area unless the image content has significantly changed which can save on hologram re-compute from frame to frame.

The first sub-area of the image may be determined by (first) determining a corresponding first sub-area of the display area. The first sub-area of the image display may correspond to the foveal vision area of a viewing system at the viewing area. The viewer may be a camera. The viewer may be a human viewer in which case the viewing system may be an eye or pair of eyes. The second sub-area of the image may be determined by (first) determining a corresponding second sub-area of the display area. The second sub-area of the display area may correspond to a non-foveal or peripheral vision area of the viewing system.

The first sub-area of the image may extend no further than the corresponding foveal vision area. Alternatively, the first sub-area of the image may extend beyond the corresponding foveal vision area. The first sub-area may extend to include the whole of an image feature of the image partially contained in the foveal vision area. The method may therefore further comprise identifying at least one image feature wherein the image feature is a recognizable object or display element of the image.

Notably, the method may further comprise determining a position of the viewer/viewing system in the viewing window to determine the first sub-area of the display area. This method may comprise eye, head or gaze-tracking the viewing system—for example.

The method may comprise determining a region of the image corresponding to the blind spot of the viewer based on the eye, head or gaze-tracking. The method may further comprise processing the image prior to calculating the hologram in order to remove image content corresponding to the blind spot of the viewer. This may save processing resources. For example, the blind spot of an eye can be determined from gaze tracking.

The method may further comprise determining a rate of change of eye or head position or gaze direction and reducing the data processing resources allocated to calculating the hologram if the rate of change of eye or head position or gaze direction is greater than a stored value. The human eye can move at about 1000° per second. If the head is moving quickly, it may not be necessary to use a high-quality image and so time on hologram compute could be saved in this situation.

The display device may have a variable display/frame rate. The method may further comprise updating the display device more quickly if the rate of change of eye or head position or gaze direction is greater than the stored value. This takes advantage of the potential to use a faster, low-quality hologram compute. For example, smooth but low quality updates could be used during head move, rather than jumpy and, perhaps, unnecessarily high quality updates.

The method may further comprise predicting a future eye or head position or gaze direction based on stored data relating to the same. Accordingly, more data processing resources may be allocated to calculating the hologram.

The method may further comprise increasing the intensity of the first sub-area of the image relative to the second sub-area prior to calculating the hologram of the image. For example, an add intensity adjustment may be applied to make the image in the Foveal region brighter also (and thereby save energy used in the rest of the image display).

In accordance with this disclosure, the image components may take different forms. That is, they may relate to a different aspect or part of the image. The image may be a polychromatic image. The first image component may be a first monochromic image component of the image and the second image component may be a second monochromatic image component of the image. The steps of calculating, displaying and propagating may be—at least partially independently—carried out for each monochromatic image component of the image.

For example, the steps of calculating, displaying and propagating in relation to a first single-color component of the image may be allocated more data processing resources than the same steps for a second single-color component of the same image. The image components may be, for example, the red, green and blue components of a color image. In these embodiments, each image component is effectively a single-color image in its own right but they are referred to herein as image components for consistency and clarity of distinction between the (composite color) image and (single-color) image components. In these embodiments—unlike other embodiments related to sub-areas of the image—each image component may comprise the same number of pixels as each other, and the image as a whole. The steps of calculating, displaying and propagating for each single-color image component may carried out in parallel or in series. A (single-color) hologram is calculated for each single-color image component. Each (single-color) hologram reconstructs a corresponding single-color image component within the display area. The plurality of single-color reconstructions may overlay each other on the display area to recreate a full color image. In these embodiments, it may therefore be said that the method comprises calculating a plurality of holograms from the image or calculating a hologram of each image component. However, it can be clearly understood that reference to the hologram with respect to an image component means, in these cases, the hologram of that image component.

The methods described in relation to dividing the image into sub-areas and dividing the image into single-color components may be combined. For example, in some embodiments, a first sub-area of a first single-color component may be allocated a first amount/quantity of data processing resources, a second sub-area of the first single-color component may be allocated a second amount/quantity of data processing resources, and a second single-color component may be allocated a third amount/quantity of data processing resources (across its entire area), wherein the first, second and third amounts/quantities of data processing resources are all different to each other. For example, the second amount/quantity of data processing may be greater than the third which may, in turn, be greater than the first. The reader will appreciate that any combination or permutation or mixing of these two concepts may be implemented in accordance with the present disclosure.

A light sensor of a viewing system arranged within the viewing area to receive the spatially-modulated light may be more sensitive to light corresponding to the first monochromatic image component than the second monochromatic image component.

The method may further comprise determining that the first monochromatic image component is visually more dominant in the image that the second monochromatic image component.

The method may further comprise determining a parameter of the background of the image, such as color, and determining that the first monochromatic image component is more like to be visible over the background than the second monochromatic image component based on the determined parameter of the image.

The present disclosure therefore encompasses prioritizing the hologram compute resource to different primary colors (red, green and blue). For example, to dedicate more compute to the green colors the eye is most sensitive to, or to a primary color dominating a region of the field of view, or to a color likely to be more visible over the background scene.

The method may further comprise eye, head or gaze-tracking of the viewing system to determine a foveal vision area of the display area, and changing the color balance of the reconstructed polychromatic image in a region of the image corresponding to a non-foveal vision area of the display area.

The method may further comprise changing the color balance of the reconstructed polychromatic image in the non-foveal region comprises moving the color balance towards 500 nm and/or decreasing the intensity of any image light having a wavelength greater than 600 nm.

Some embodiments make the non-foveal color balance different to make overall display more efficient (exploiting that the peripheral vision (rods) has lower color sensitivity . . . e.g., use more color that is most sensitively detected by the eye and/or with higher wall plug efficiency). The rods of the human eye are most sensitive at wavelength 500 nm (so preferable to use green) and insensitive to wavelength greater than 640 nm (so little point using red in the peripheral region).

There is disclosed herein a light engine (e.g., image projector such as holographic projector) arranged to reconstruct an image from a hologram. The light engine comprises an image processor arranged to receive an image for display within a display area and determine a first image component of the image. The display area may be viewable from a viewing area spatially separated therefrom. The light engine may further comprise a hologram engine arranged to calculate a hologram of the image, wherein the hologram is configured to angularly distribute light in accordance with position within the image. Accordingly, angular channels of angularly distributed light correspond with respective continuous regions of the image. The light engine further comprises a display device arranged to display the hologram and spatially modulate light in accordance with the displayed hologram. The light engine may further comprise a pupil expander arranged to propagate the spatially modulated light therethrough to provide a plurality of different light propagation paths for the spatially modulated light from the display device to the viewing area. Each light propagation path corresponds to a respective continuous region of the image owing to the angular distribution of light from the hologram. The light engine is arranged to allocate more data processing resources to calculation of the hologram with respect to the first image component than a second image component of the image There is also disclosed herein a hologram engine arranged to determine a hologram of an image for viewing using a head-up display. The head-up display comprises a display device and a pupil expander. The head-up display is configured to operate with at least one viewing system. Each viewing system comprises an entrance pupil on an entrance pupil plane, lens on a lens plane and a sensor on a sensor plane. The head-up display may be configured to operate with a pair of viewing systems such as a pair of eyes. The display device (e.g., spatial light modulator) is arranged to display the hologram. The pupil expander is arranged to receive light spatially modulated in accordance with the hologram. For example, the displayed hologram may be illuminated with at least partially coherent light from a source. The display device spatially modulates the received light in accordance with the displayed hologram.

The hologram engine may be embodied in a display driver such as a field programmable gate array, "FPGA", or application-specific integrated circuit, "ASIC". The display driver may be part of a picture generating unit, "PGU", for a head-up display, "HUD".

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g., in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g., phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values.

The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures:

FIG. 6B shows a magnified view of the optical paths of FIG. 6a;

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
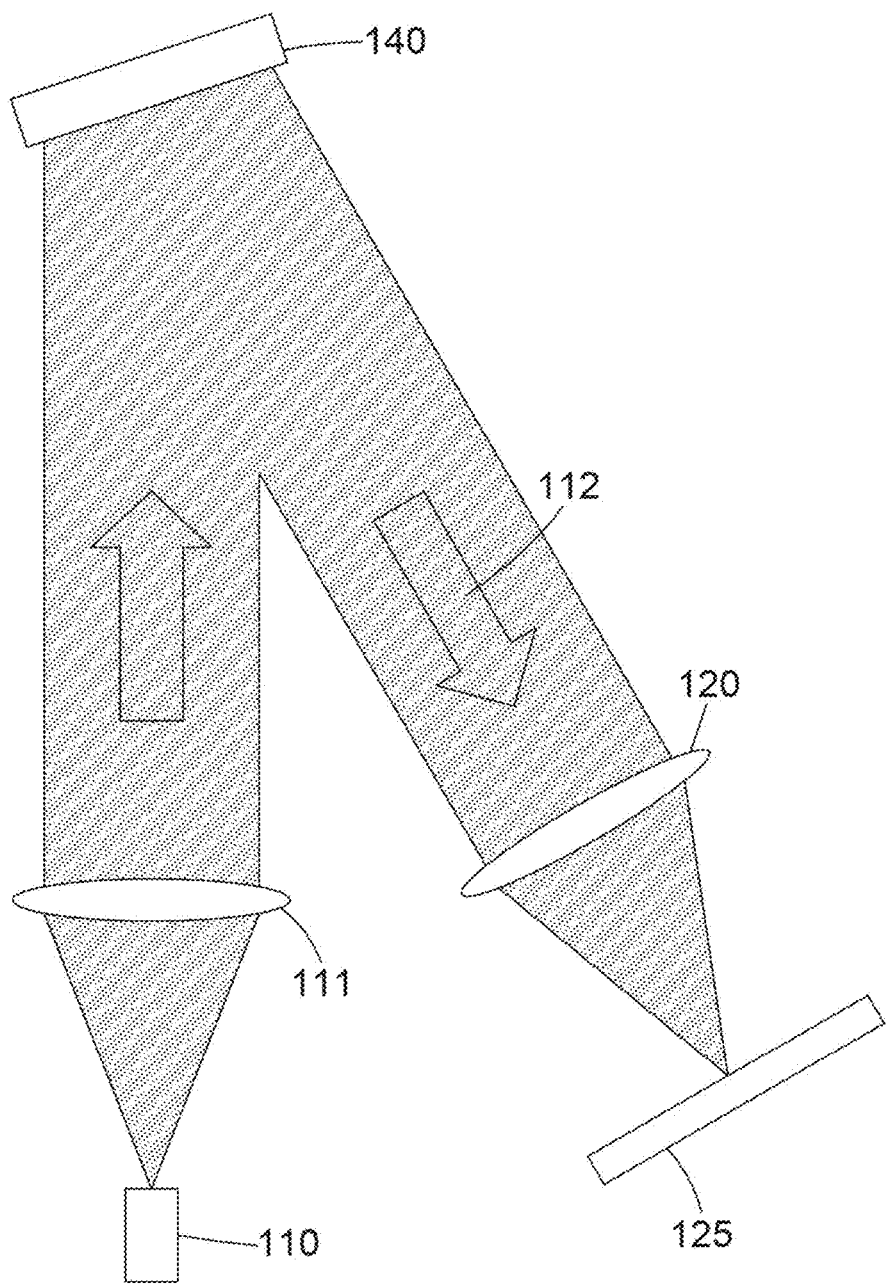
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g., two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Conventional Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e., a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi$ [u, v] of the Fourier transform of the data set which gives rise to a known amplitude information T[x, y], wherein the amplitude information T[x, y] is representative of a target image (e.g., a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi$[u, v] is used as the hologram to form a holographic representative of the target image at an image plane. The hologram is a data set (e.g., 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g., 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
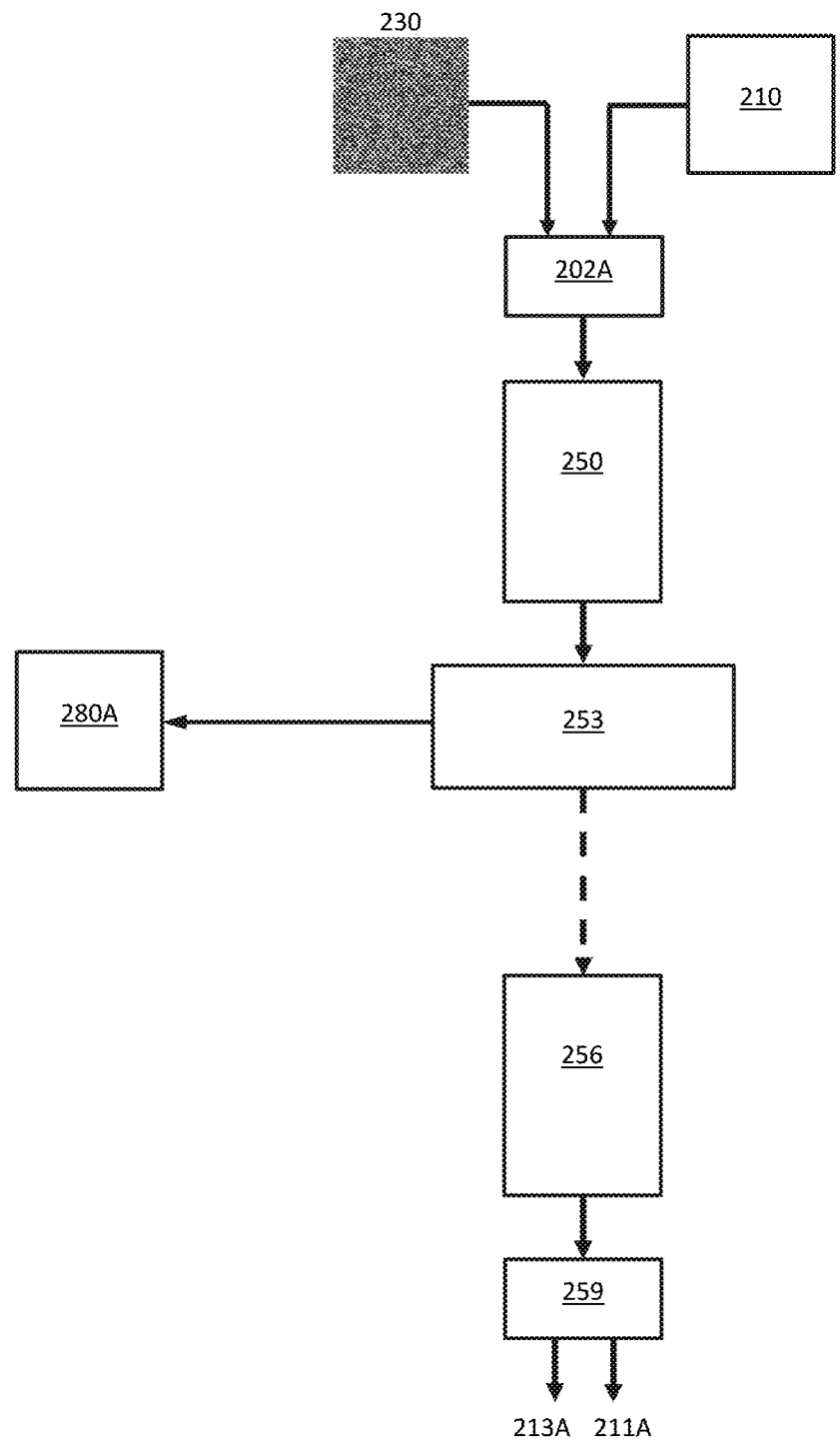
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e., not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
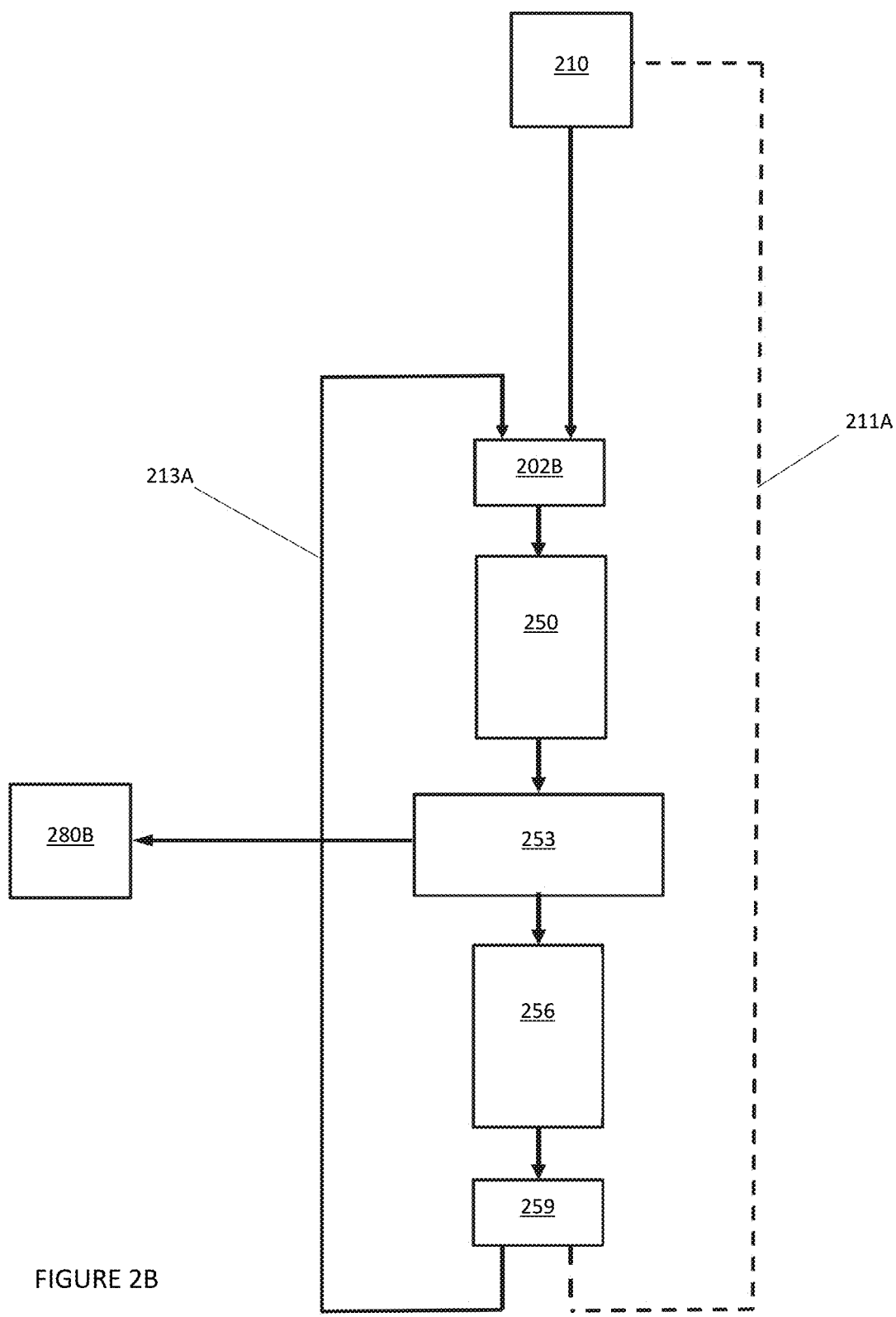
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
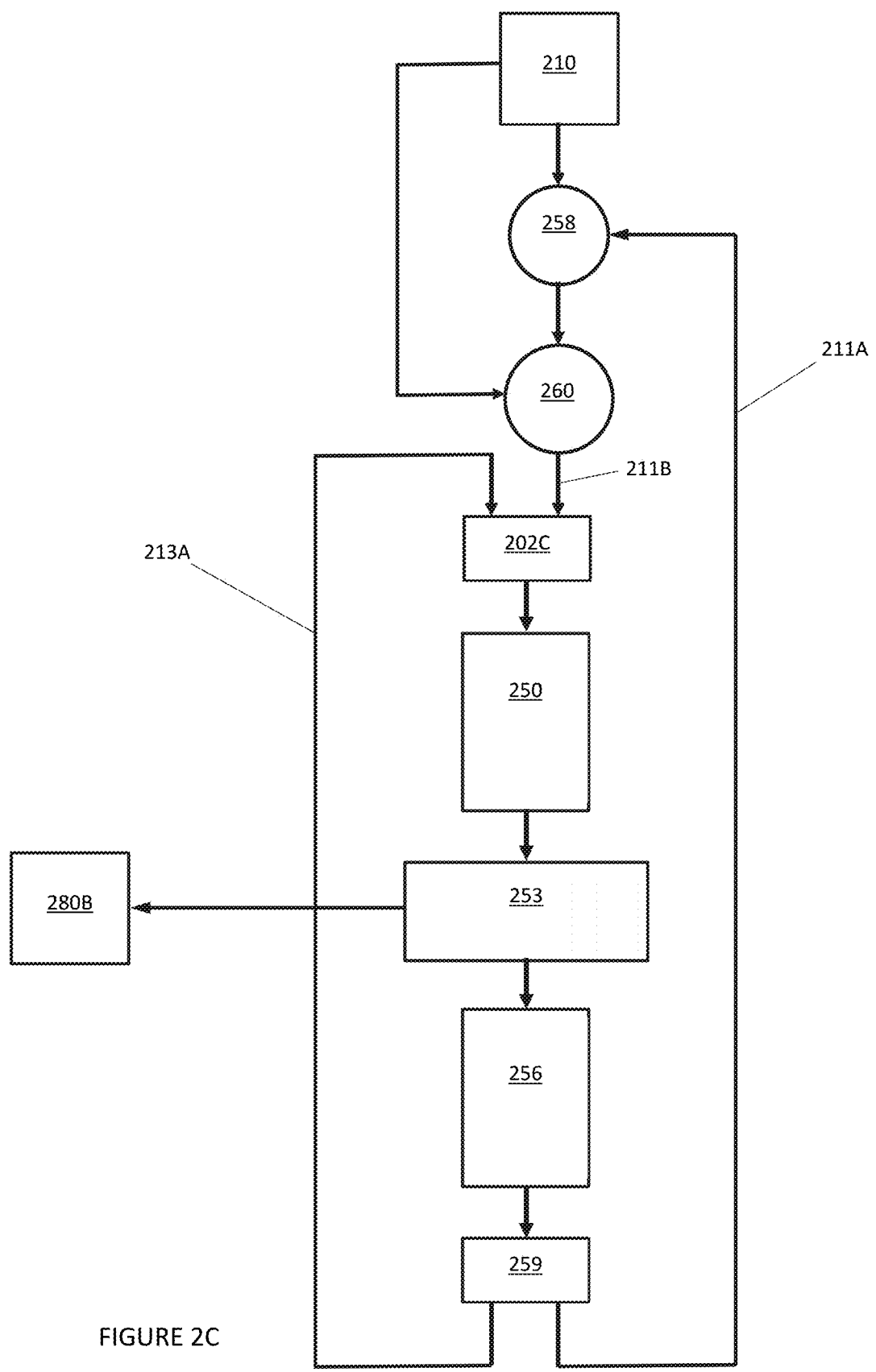
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210.

This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the center of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e., the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g., a few centimeters in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
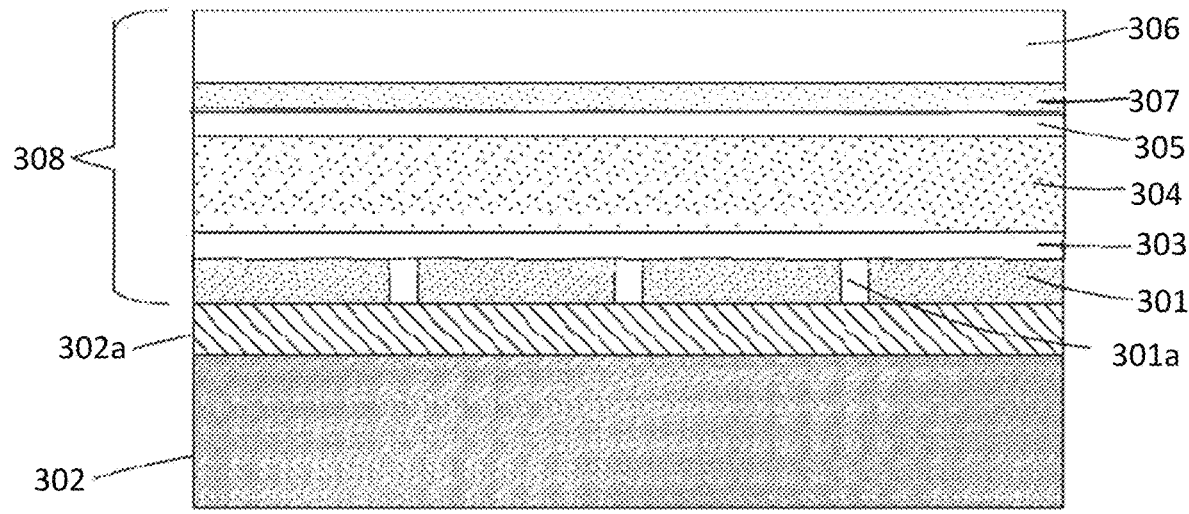
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g., of glass. A single transparent electrode 307 e.g., of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e., no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Image Projection Using a Small Display Device and a Long Viewing Distance

The present disclosure relates to image projection wherein the separation between the display device and viewer is much greater than the size of the display device. The viewing distance (i.e., distance between the viewer and display device) may be at least an order of magnitude greater than the size of the display device. The viewing distance may be at least two orders of magnitude greater than the size of the display device. For example, the pixel area of the display device may be 10 mm×10 mm and the viewing distance may be 1 m. The image projected by the system is formed on a display plane that is spatially separated from the display device.

In accordance with the present disclosure, the image is formed by holographic projection. A hologram is displayed on the display device. The hologram is illuminated by a light source (not shown) and an image is perceived on a display plane that is spatially separated from the hologram. The image may be real or virtual. For the purpose of the explanation that follows, it is helpful to consider a virtual image formed upstream of the display device. That is, appearing behind the display device. However, it is not essential that the image is a virtual image and the present disclosure is equally applicable to a real image formed between the display device and viewing system.

The display device comprises pixels that display the hologram. The pixel structure of the display device is diffractive. The size of the holographic image is therefore governed by the rules of diffraction. A consequence of the diffractive nature of the display device is explained below with reference to FIG. 4.

Figure 4:
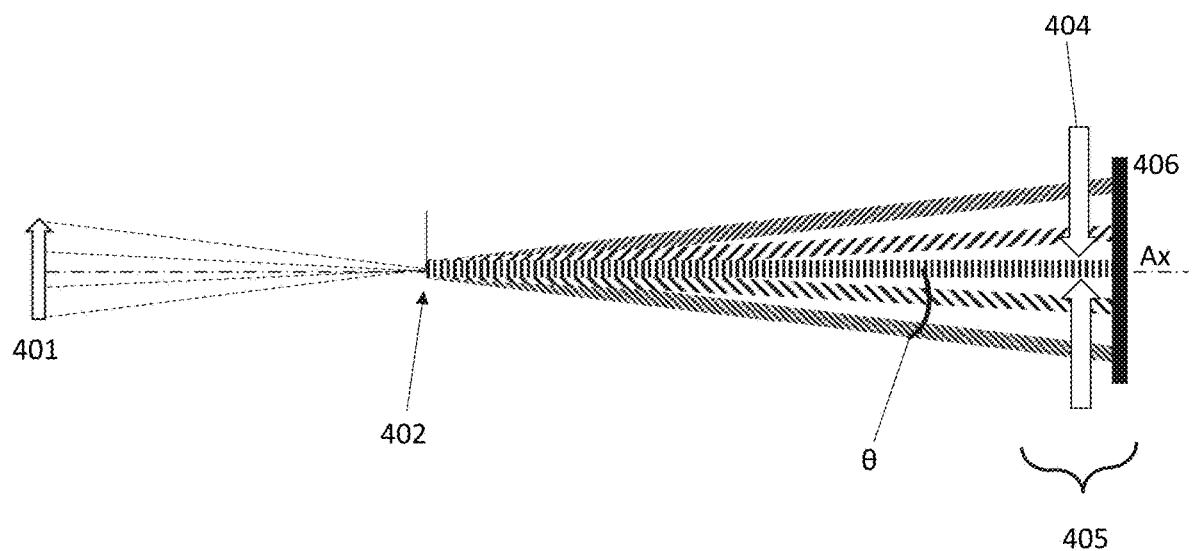
FIG. 4 shows angular content of a virtual image effectively propagating from a display device towards an aperture.

FIG. 4 shows a pixelated display device 402 arranged to display a hologram forming a virtual image 401 upstream of the display device 402. The diffraction angle, θ, of the display device determines the size of the virtual image 401. The virtual image 401, display device 402 and viewing system 405 are arranged on an optical axis, Ax.

The viewing system 405 has an entrance aperture 404 and viewing plane 406. The viewing system 406 may be a human eye. The entrance aperture 404 may therefore be the pupil of the eye and the viewing plane 406 may be the retina of the eye.

The light travelling between the display device 402 and viewing system 405 is modulated with a hologram of the image (not the image itself). However, FIG. 4 illustrates how the hologram divides the virtual image content by angle. Each illustrated light ray bundle relates to a different part of the virtual image 401. More specifically, the light in each light ray bundle is encoded by the hologram with information about one part of the virtual image. FIG. 4 shows five example ray bundles each characterized by a respective angle to the optical axis, Ax, and each representing a respective part of the virtual image. In this example, one of the light bundles passes through the pupil 404 and the other four light bundles are blocked by the pupil 404. Again, the five different ray bundles correspond to five different parts of the virtual image 401. The full image content of the virtual image is effectively divided by angle. The light bundle travelling along the optical axis, Ax, carries the center part of the image information—that is, the information relating to the center of the image. The other light bundles carry the other parts of the image information. The two light bundles shown at the extremes of the light cone carry the edge parts of the image information. A consequence of this division of the image information by angle is that not all image content can pass through the entrance aperture 404 of the viewing system at a given viewing position. In other words, not all image content is received by the eye. In the example of FIG. 4, only one of the five light bundles illustrated passes through the pupil 404 at any viewing position. The reader will understand that five light bundles are shown by way of example only and the process described is not limited to division of the image information of the virtual image into only five light bundles.

In this example, the center part of the image information is received by the eye. The edge part of the image information is blocked by the pupil of the eye. The reader will understand that if the viewer moves up or down, a different light bundle may be received by the eye and, for example, the center part of the image information may be blocked. The viewer therefore only sees a portion of the full image. The rest of the image information is blocked by the entrance pupil. The view of the viewer is heavily restricted because they are effectively looking at the image through the small aperture of the display device itself.

In summary, light propagates over the range of diffraction angle from the display device. At a 1 m viewing distance, only a small range of angles from the display device can propagate through the eye's pupil to form image at the retina for a given eye position. The only parts of the virtual image that are visible are the ones falling within the small angular range shown in FIG. 4 that passes through the entrance aperture. Accordingly, the field of view is very small, and the specific angular range depends heavily on the eye position.

The problem of the small field of view and sensitivity to eye position explained with reference to FIG. 4 is a consequence of the large viewing distance and small aperture of the display device. The importance of viewing distance is explained further with reference to FIGS. 5 to 7.

Figure 5A:
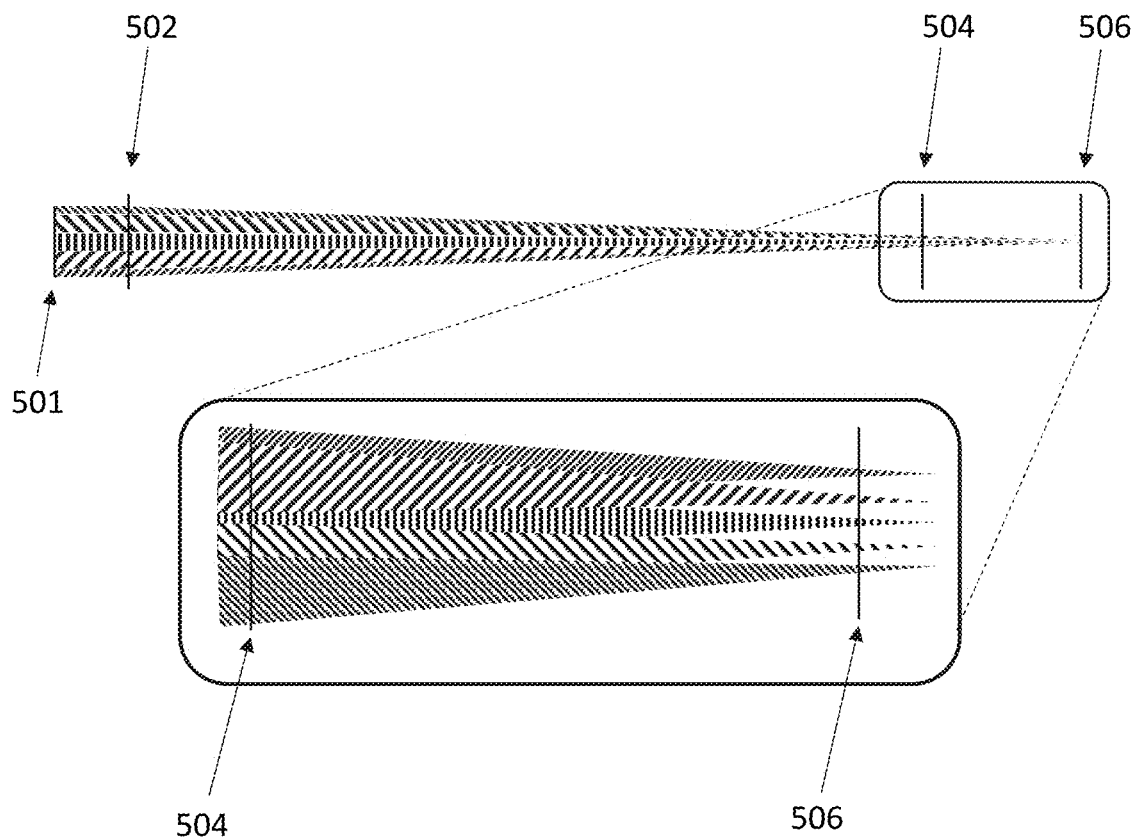
FIG. 5A shows a viewing system with a relatively small propagation distance.

FIG. 5A shows a display device 502 arranged to display a hologram and propagate light modulated in accordance with the hologram to a viewing system comprising an entrance aperture 504 and viewing plane 506. The virtual image 501 is at infinity and so the rays traced between the virtual image and display device are collimated. The lower part of FIG. 5A shows a magnified view of the viewing system. This figure is schematic and therefore physiological detail of the eye is not shown. In practice, there is, of course, a light source (not shown in FIG. 5A) arranged to illuminate the display device 502.

FIG. 5A only shows those rays of light that can propagate through the aperture 504; any other rays, which cannot pass through the aperture 504, are omitted. However, it will be understood that those other rays would also propagate from the display device 502, in practice. In FIG. 5A, the distance between the display device and viewing plane is small enough that the full diffraction angle from the display device can form the image on the retina. All light propagation paths shown from the virtual image pass through the entrance aperture. Accordingly, all points on the virtual image map onto the retina and all image content is delivered to the viewing plane. The field of view of the perceived image is therefore a maximum. At the optimum position, the field of view is equal to the diffraction angle of the display device. Interestingly, different image points on the retina are formed from light propagating from different regions on the display device 502—e.g., the image point closest to the top of FIG. 5A is formed from light propagating from the lower portion of the display device only. Light propagating from other regions of the display device does not contribute to this image point.

Figure 5B:
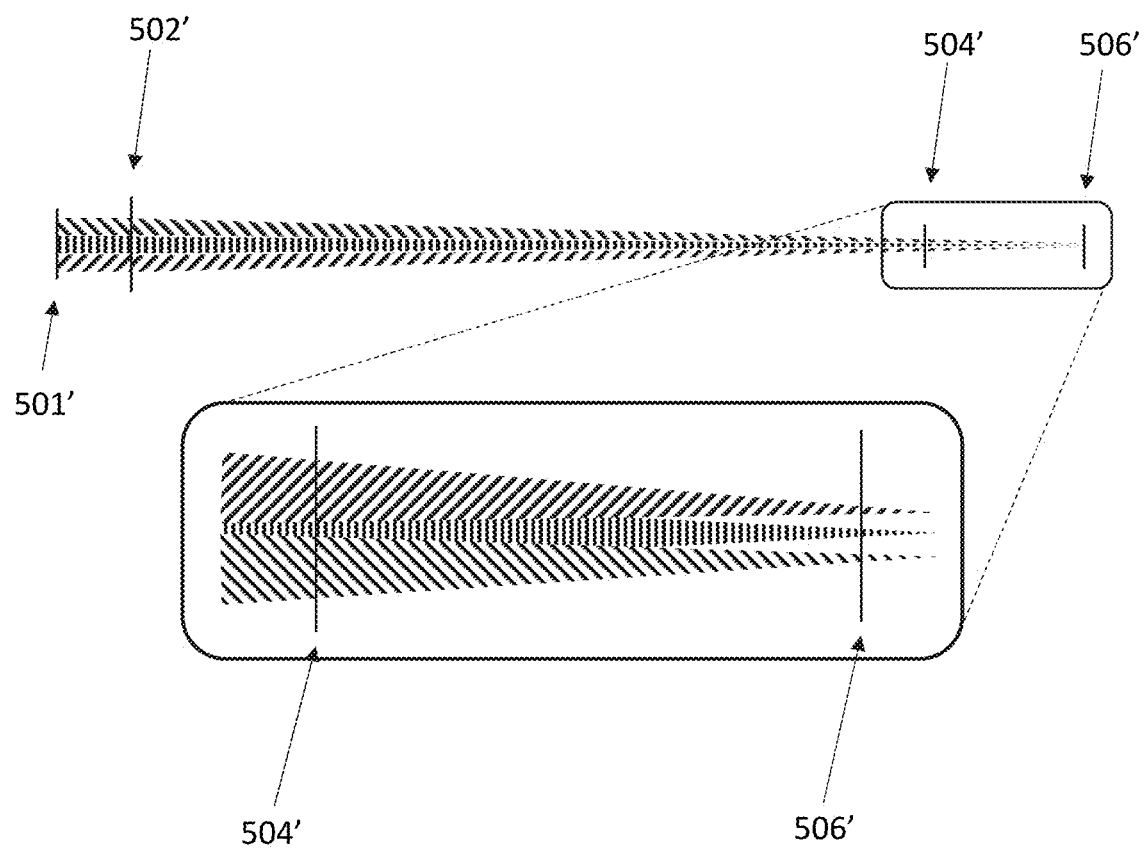
FIG. 5B shows a viewing system with a relatively large propagation distance.

FIG. 5B shows the situation that arises as the viewing distance is increased.

In more detail, FIG. 5B shows a display device 502' arranged to display a hologram and propagate light modulated in accordance with the hologram to a viewing system comprising an entrance aperture 504' and viewing plane 506'. The virtual image 501' is at infinity and so the rays traced between the virtual image and display device are collimated. The lower part of FIG. 5B shows a magnified view of the viewing system. This figure is schematic and therefore physiological detail of the eye is not shown. In practice, there is, of course, a light source (not shown in FIG. 5B) arranged to illuminate the display device 502'.

FIG. 5B only shows those rays of light that can propagate through the aperture 504'. At the larger viewing distance of FIG. 5B, some of the ray bundles are blocked by the entrance aperture 504'. Specifically, ray bundles associated with edge parts of the virtual image are blocked by the entrance pupil 504'. Accordingly, the entire virtual image is not visible and the part of the virtual image that is visible is heavily dependent on eye position. Thus, large distances between the display device and viewing system are problematic owing to the small size of the display device.

Figure 6A:
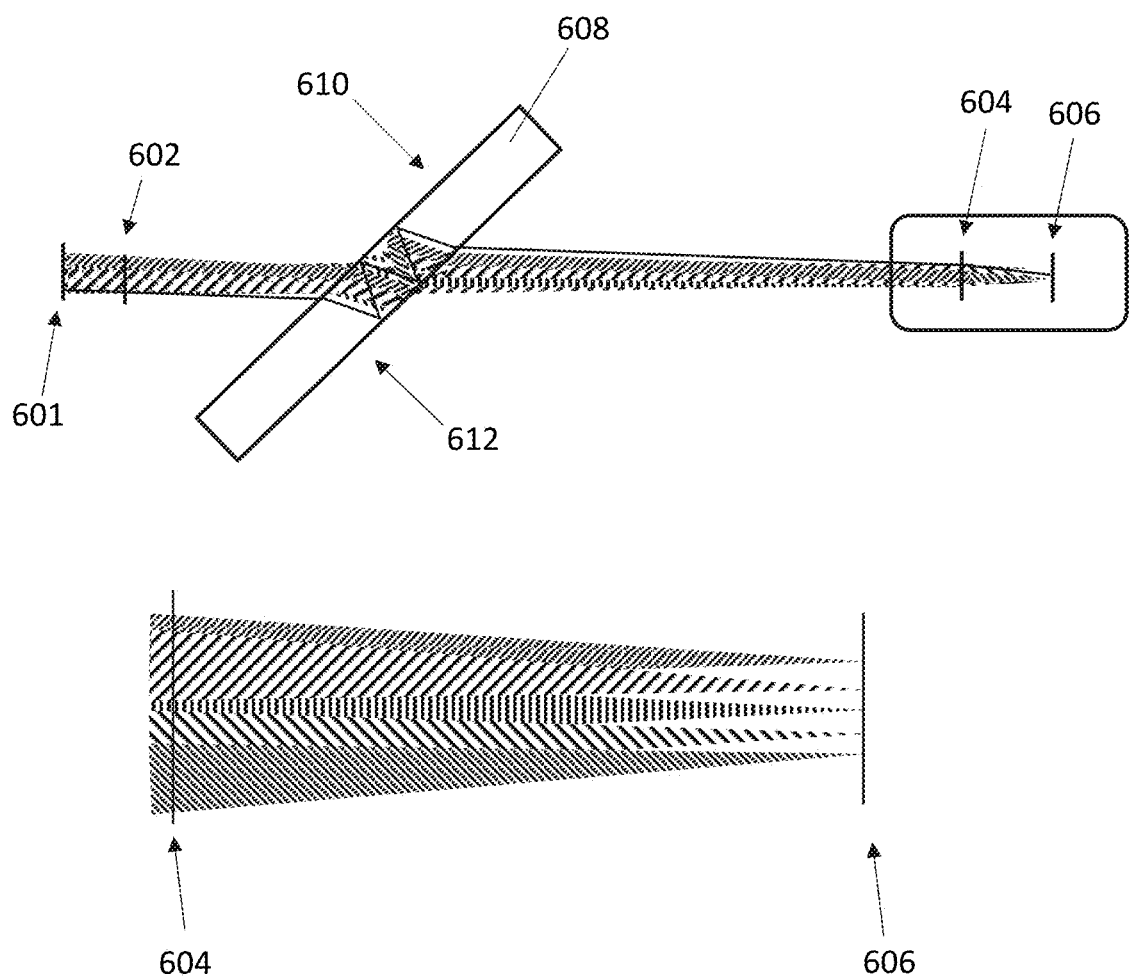
FIG. 6A shows a viewing system with a relatively large propagation distance, which includes a waveguide, for forming a virtual image at infinity.

FIG. 6A shows an improved system comprising a display device 602, propagating light that has been encoded with a hologram displayed on the display device 602, towards a viewing system that comprises an entrance aperture 604 and a viewing plane 606. In practice, there is, of course, a light source (not shown) arranged to illuminate the display device 602. The improved system further comprises a waveguide 608 positioned between the display device 602 and the entrance aperture 604. The lower part of FIG. 6A shows a magnified view of the entrance pupil 604 and the viewing plane 604. This figure is schematic and therefore physiological detail of the eye is not shown.

The viewing distance of FIG. 6 is the same as that of FIG. 5B. However, the ray bundles that were blocked in FIG. 5B are effectively recovered by the waveguide 608 such that the full image information is received by the viewing system—despite the longer viewing distance.

The presence of the waveguide 608 enables all angular content from the display device 602 to be received by the eye, even at this relatively large projection distance. This is because the waveguide 608 acts as a pupil expander, in a manner that is well known and so is described only briefly herein.

In brief, the waveguide 608 comprises a substantially elongate formation. In this example, it comprises an optical slab of refractive material, but other types of waveguide are also well known and may be used. The waveguide 608 is located so as to intersect the light cone that is projected from the display device 602, for example at an oblique angle. The size, location, and position of the waveguide 608 are configured to ensure that light from each of the five ray bundles, within the light cone, enters the waveguide 608. Light from the light cone enters the waveguide 608 via its first planar surface 610 (located nearest the display device 602) and is guided at least partially along the length of the waveguide 608, before being emitted via its second planar surface 612, substantially opposite the first surface 610 (located nearest the eye). As will be well understood, the second planar surface 612 is partially reflective, partially transmissive. In other words, when each ray of light travels, within the waveguide 608, from the first planar surface 610 to the second planar surface 612 of the waveguide 608, some of the light will be transmitted out of the waveguide 608 and some will be reflected by the second planar surface 612, back towards the first planar surface 610. The first planar surface 610 is reflective, such that all light that hits it, from within the waveguide 608, will be reflected back towards the second planar surface 612.

Therefore, some of the light may simply be refracted between the two planar surfaces 610, 612 of the waveguide 608 before being transmitted, whilst other light may be reflected, and thus may undergo one or more reflections, (or 'bounces') between the planar surfaces 610, 612 of the waveguide 608, before being transmitted. A net effect of the waveguide 608 is therefore that the transmission of the light is effectively expanded across multiple locations on the second planar surface 612 of the waveguide 608. All angular content output by the display device 602 may thus be present, at a greater number of positions on the display plane (and at a greater number of positions on the aperture plane) than would have been the case, in the absence of the waveguide 608. This means that light from each ray bundle may enter the entrance aperture 604 and contribute to an image formed by the viewing plane 606, despite the relatively large projection distance. In other words, all angular content from the display device 602 can be received by the eye. Therefore, the full diffraction angle of the display device 602 is utilized and the viewing window is maximised for the user. In turn, this means that all the light rays contribute to the perceived virtual image 601.

Figure 6B:
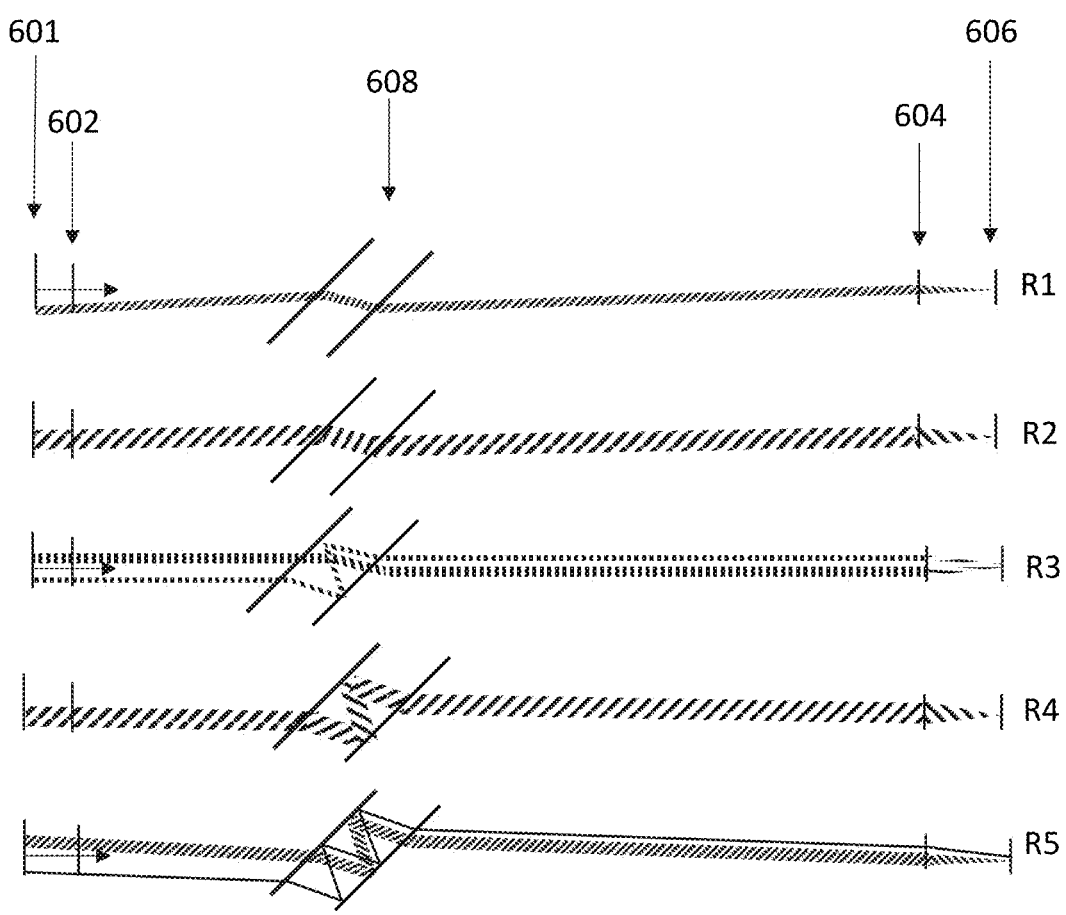

FIG. 6B shows the individual optical paths for each of the five ray bundles that contribute to five respective image points within the virtual image 601 that is formed in FIG. 6A—labelled from top to bottom as R1 to R5, respectively. As can be seen therein, the light of each of R1 and R2 is simply refracted and then transmitted by the waveguide 608. The light of R4, on the other hand, encounters a single bounce before being transmitted. The light of R3 comprises some light from a corresponding first part of the display device 602 that is simply refracted by the waveguide 608 before being transmitted, and some light from a second, different corresponding part of the display device 602 that encounters a single bounce before being transmitted. Similarly, the light of R5 comprises some light from a corresponding first part of the display device 602 that encounters a single bounce before being transmitted and some light from a second, different corresponding part of the display device 602 that encounters two bounces before being transmitted. For each of R3 and R5, two different parts of the LCOS propagate light corresponding to that part of the virtual image.

The present inventors have recognised that, at least in some applications, it is preferable for the virtual image distance—i.e., for the distance from the viewer to the virtual image—to be finite, as opposed to the virtual image being formed at infinity. In certain applications, there will be a preferred virtual image distance, at which it is desirable or necessary for the virtual image content to appear. For example, this can be the case in a head-up display, for example in an automotive setting, for example if virtual image content is to be superimposed onto real content that is being viewed by the viewer through a vehicle windscreen. For example, a desired virtual image distance may comprise the virtual image content being formed a few meters, for example 3 meters or 5 meters, in front of the viewer's vehicle or windscreen.

Figure 7:
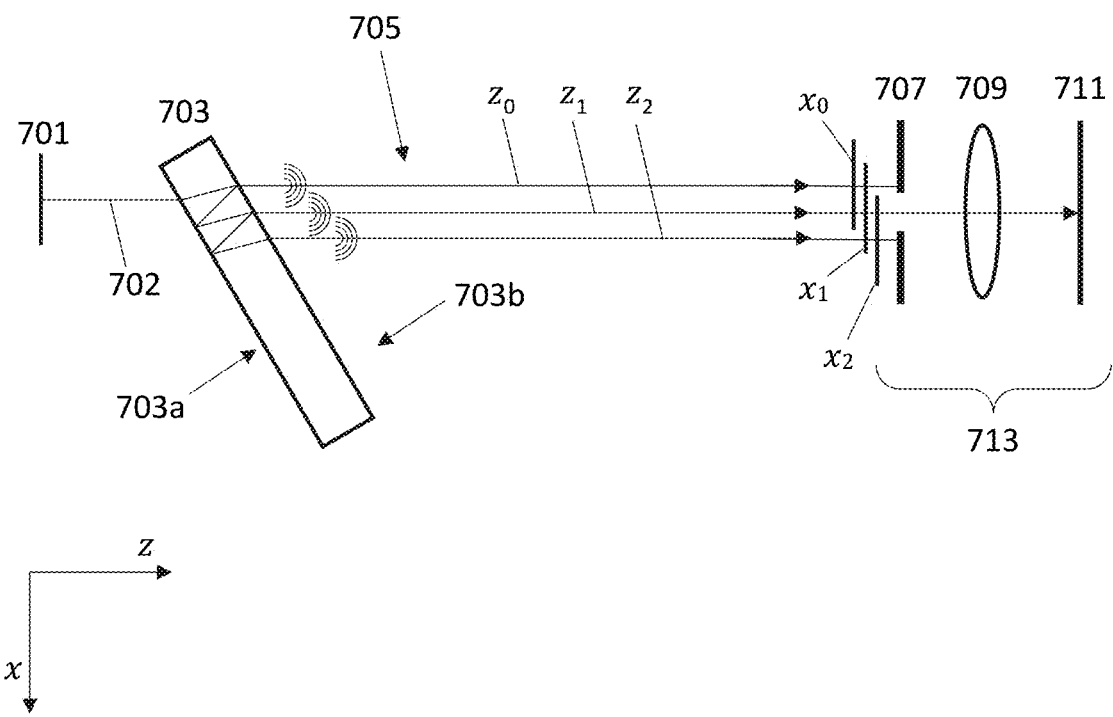
FIG. 7 shows the optical system in accordance with embodiments.

Hologram Calculation for Small Display Device, Long Viewing Distance and Pupil Expander The inventors have devised a method of calculating hologram for the optical system shown in FIG. 7. Importantly, the display device is relatively small and the projection distance is relatively long. The hologram is projected directly to the viewing system and the method is capable of implementation in real-time. The relatively small size of the display device and relatively long projection distance necessitate a pupil expander. The method addresses the different paths through the pupil expander. The method allows image content to appear at different distances from the viewing system and/or plural distances, optionally, at the same time—e.g., using one hologram. The method allows image content to appear downstream of the display device and upstream of the display device, optionally, at the same time—e.g., using one hologram.

FIG. 7 shows a spatial light modulator 701 operable to display a hologram of an image. In this embodiment, the spatial light modulator 701 is a liquid crystal on silicon device arranged to modulate the phase of received light. The spatial light modulator 701 is illuminated by at least partially coherent light from a light source not shown. The light source may be a laser diode. The spatial light modulator 701 outputs light that is spatially modulated in accordance with the display hologram. FIG. 7 shows one light ray 702 of the spatially modulated light. The spatially modulated light is received by a pupil expander 703. The pupil expander 703 is inclined relative to the plane of the display device 701. The pupil expander 703 therefore receives light at non-normal incidence. The incident angle (the angle the optical axis makes with the pupil expander) may be less than 25 degrees such as 10 to 20 degrees. The pupil expander comprises an input surface 703a that receives the spatially modulated light and an output surface 703b. The input surface 703a and output surface 703b are substantially parallel and elongate in a direction of pupil expansion. The input surface 703a comprises at least a portion that is substantially fully reflection (e.g., R=1). The output surface 703b comprises at least a portion that is highly reflective but partially transmissive (e.g., R=0.9 and T=0.1). The reflective surfaces are arranged such that spatially modulated light bounces back and forth therebetween, and light is emitted at a plurality of points along the output surface 703b, as described above with reference to waveguide 608 of FIG. 6. In this embodiment, the pupil expander is substantially elongate. The pupil expander provides pupil expansion in one-direction—namely, the elongate direction—but the present disclosure may be expanded to include the presence of a second pupil expander arranged to expand the pupil in an orthogonal direction.

FIG. 7 shows how light ray 702 has been effectively replicated twice to form three propagation paths 705 each associated with a different distance, $Z_0$, $Z_1$ and $Z_2$. The shortest propagation path corresponds to $Z_0$ and, in this example, light that has passed through the waveguide without any internal reflections. The middle-distance propagation path of the three shown corresponds to $Z_1$ and two internal reflections in the pupil expander (one by each surface). The longest propagation path shown corresponds to $Z_2$ and four internal reflections in the pupil expander (two by each surface). The planes $x_0$, $x_1$ and $x_2$ show the spatial extent of the light field associated with each of the three propagation paths, $Z_0$, $Z_1$ and $Z_2$, respectively. More specifically, FIG. 7 shows how the three planes $x_0$, $x_1$ and $x_2$ are offset from each other in the x-direction FIG. 7 further shows a viewing system 713 comprising an entrance pupil 707, a lens 709 and a light sensor 711. In embodiments, the viewing system 713 is a human eye and the light sensor 711 is the retina of the eye. FIG. 7 shows how only some of the light field associated with each propagation path passes through the entrance 707. FIG. 7 shows the light ray associated with center of the middle-distance propagation path passing through the center of the entrance pupil 707. But, for example, the light ray associated with the center of the light field of shortest propagation path is blocked by a top portion of the aperture 707. However, other light rays associated with the light field of the shortest propagation path can pass through the aperture 707. The light ray associated with the center of the light field of the longest propagation path is blocked by a lower portion of the aperture 707. However, other light rays associated with the light field of the longest propagation path can pass through the aperture 707 too.

Light passing through aperture 707 is focused by lens 709 onto the light sensor 711. The plane of the light sensor 711 is substantially parallel to the plane of the display device 701, and is therefore inclined relative to the elongate dimension of the pupil expander 703 too.

FIG. 7 shows three possible light propagation paths by way of example only. The present disclosure is not limited by the number of propagation paths. That is, as the skilled person will appreciate from the following description, the method may be extended to factor-in any number of light propagation paths. Likewise, it is not essential that the pupil expander is inclined relative to the display plane and sensor plane.

Figure 8:
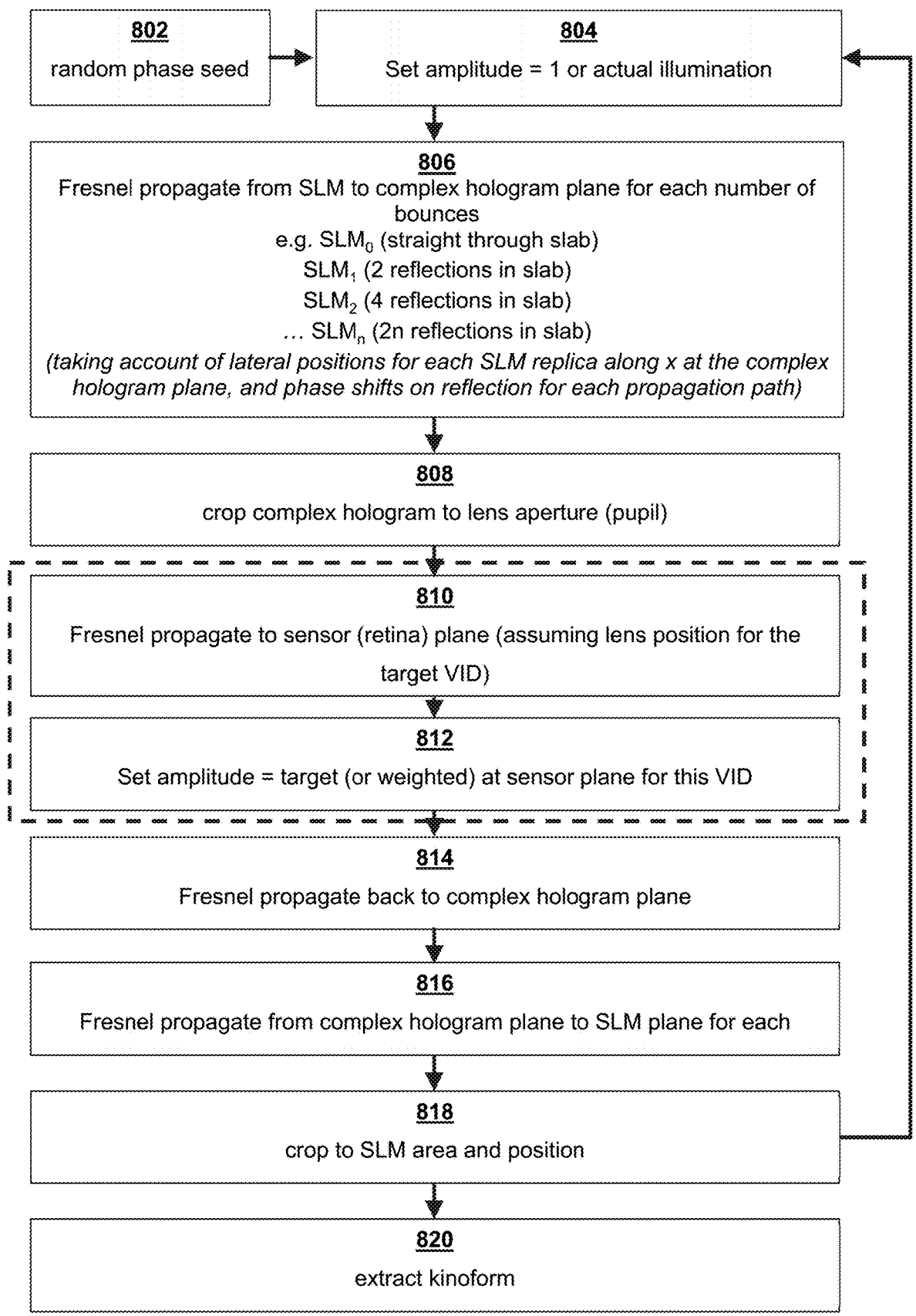
FIG. 8 is a flowchart showing the steps of a method in accordance with embodiments.

FIG. 8 is a flowchart showing the steps of the method. The method resembles a Gerchberg-Saxton type algorithm which uses mathematical transforms back and forth between the image plane and hologram to converge on a phase hologram corresponding to the image. The amplitude component of the light field after each propagation to the image plane or hologram plane is modified or constrained but the phase component is preserved.

A zeroth stage of the method comprises steps 802 and 804. The zeroth stage comprises forming a zeroth complex light field. Step 802 provides a random phase seed forming the phase component of the zeroth complex light field. Step 804 provides the amplitude component of the zeroth complex light field. The amplitude component may be unity or an amplitude distribution representative of the light of a light source that will be used to reconstruction the image from the hologram In step 806, the zeroth complex light field is Fresnel propagated from the spatial light modulator 701 (i.e., from the hologram plane) to the entrance pupil 707 of the viewing system 713 (more specifically, to the plane containing the entrance pupil 707 of the viewing system 713). Again, this embodiment refers to Fresnel propagation as just one example of a number of different mathematical transforms that may be used without departing from the spirit or scope of this disclosure. Step 806 is performed for each number of bounces or internal reflections provided by the pupil expander 703 to form a complex light field in respect of each light propagation path. Step 806 includes taking account of the lateral position of the complex light field in the x-direction at the plane of the entrance pupil 707, and phase shifts on each reflection within the pupil expander 703. The different complex light fields may be combined, for example, by addition. The first stage further comprises step 808 of cropping the combined complex light field in accordance with the size and shape of the entrance pupil 707 to form the first complex light field at the entrance pupil 707.

A second stage of the method comprises steps 810 and 812. In step 810, a second complex light field is determined by propagating the first complex light field from the entrance pupil through lens 709 and to the plane of the light sensor 711. Step 812 comprises modifying the amplitude component of the complex light field arriving at the light sensor 711. More specifically, step 812 comprises replacing the amplitude component of the complex light field with the amplitude component of the target image or an amplitude component based on that of the target image such as a weighted version of the amplitude component of the target image. The position of the lens 709 used in the propagation determines the image distance—that is, wherein space the image content will appear. In some embodiments, the image is a virtual image and this distance may be referred to as a virtual image distance, "VID".

Advantageously, the method disclosed herein allows image content to be formed at a plurality of different image distances—e.g., multiple VIDs—using the same hologram. The inventors identified that this may be achieved by repeating the second stage for each image distance by considering different positions of lens 709 in the z-direction. The complex light fields determined in accordance with this approach for each different image distance may be combined by addition, for example.

A third stage of the method comprises step 814 in which the second complex light field is propagated back to the entrance pupil 707 via the lens 709. This may be referred to as a reverse propagation merely to reflect that the light is travelling in the opposite z-direction. In some embodiments, the reverse propagation is a mathematical inverse of the corresponding "forward" propagation. The third stage also comprises cropping the propagated light field in accordance with the size and shape of the entrance pupil 707 to form the third complex light field.

A fourth stage comprises steps 816 and 818. In step 816, the light is propagated back to the plane of the spatial light modulator 702 via the plurality of light propagations paths of the pupil expander, in the matter described above in relation to the first stage—but in the opposite light direction, of course (i.e., a "reverse" propagation). Step 818 comprises cropping the propagated light field in accordance with the size and position of the active/pixel area of the display device. The number of complex values of each complex light field may be equal or less than the number of pixels of the display device.

Step 820 comprises extracting the hologram from the fourth complex light field. The hologram may comprise the phase values of the fourth complex light field in which case the hologram may be referred to as a kinoform. As explained earlier in this disclosure, the method may equally start at the image plane (i.e., the third stage). At least one iteration of each stage is required in accordance with this disclosure. FIGS. 9 and 10 describe the hologram formed by this method.

Light Channeling

Figure 9A:
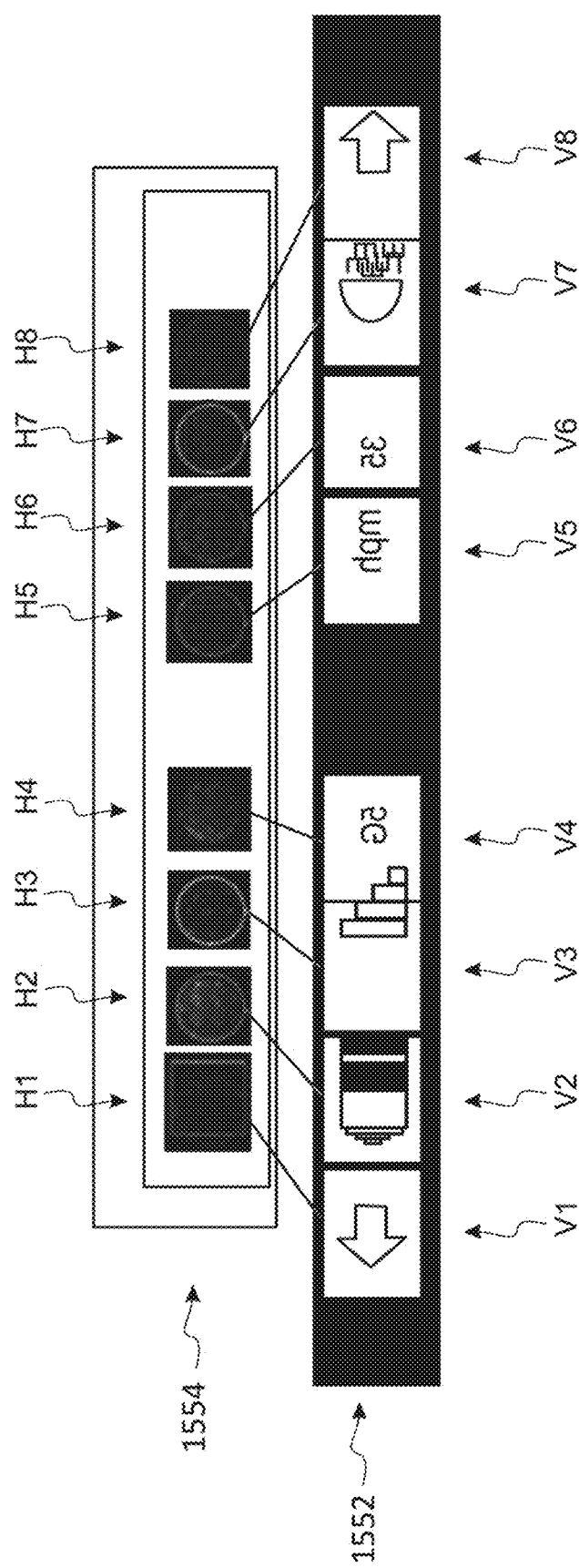
FIG. 9A shows an image comprising a plurality of image areas (bottom) and corresponding hologram comprising a plurality of hologram components (top)
Figure 9B:
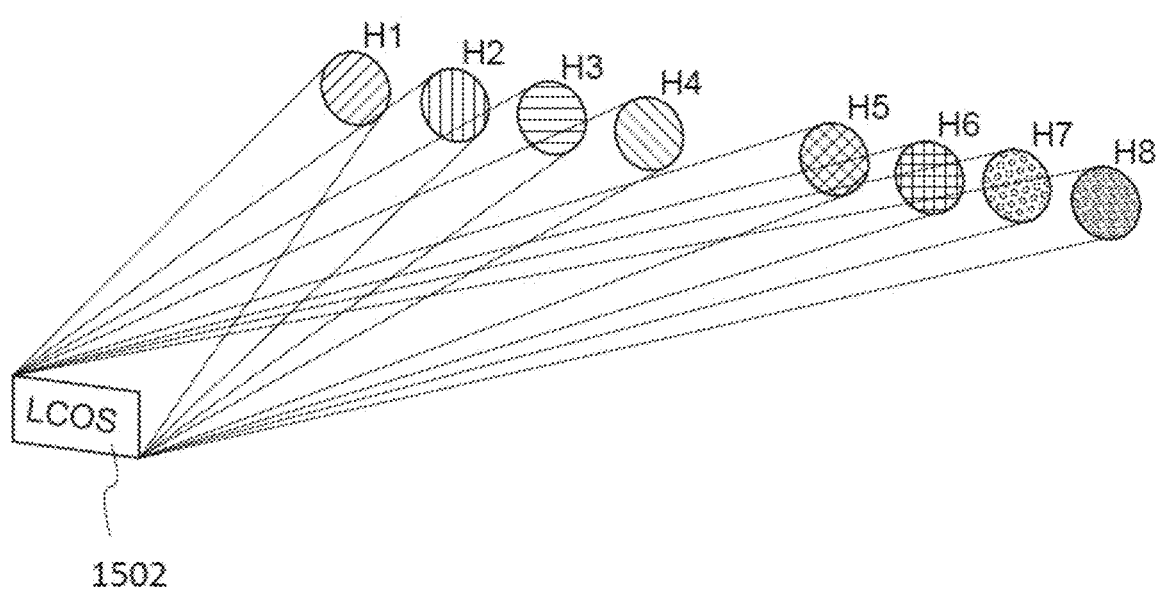
FIG. 9B shows a hologram, in accordance with the present disclosure, characterised by the routing or channeling of holographically encoded light into a plurality of discrete hologram channels.
Figure 10:
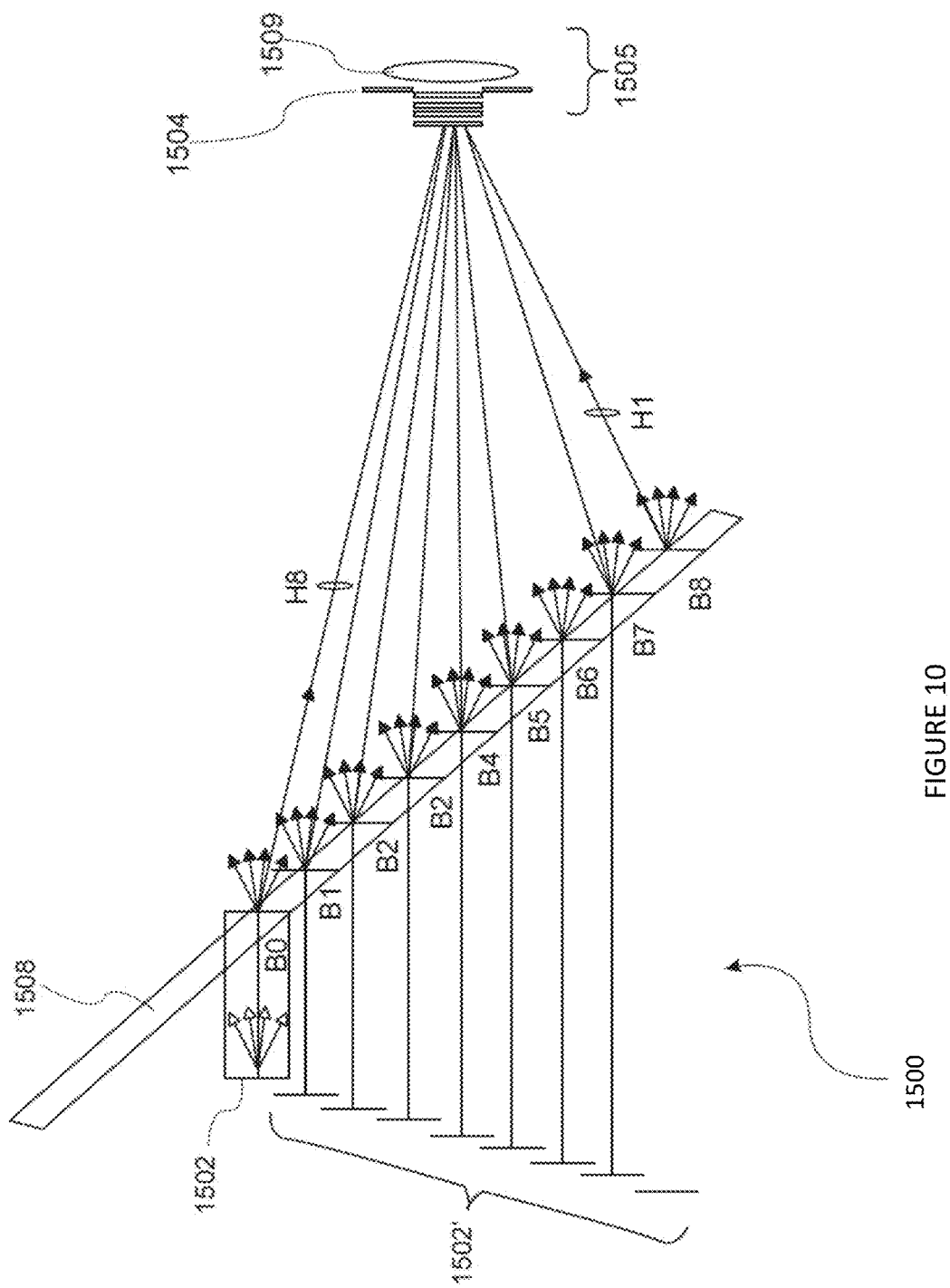
FIG. 10 shows an optimised system arranged to route the light content of each hologram channel through a different optical path to the eye.

FIG. 9A shows an image 1552 for projection comprising eight image areas/components, V1 to V8. FIG. 9A shows eight image components by way of example only and the image 1552 may be divided into any number of components. FIG. 9A also shows the encoded light pattern 1554 (i.e., hologram) that can reconstruct the image 1552—e.g., when transformed by the lens of a suitable viewing system. The encoded light pattern 1554 comprises first to eighth sub-holograms or components, H1 to H8, corresponding to the first to eighth image components/areas, V1 to V8. FIG. 9A further shows how a hologram calculated in accordance with this disclosure effectively decomposes the image content by angle. The hologram may therefore be characterised by the channeling of light that it performs. This is illustrated in FIG. 9B. Specifically, the hologram in accordance with this disclosure directs light into a plurality of discrete areas. The discrete areas are discs in the example shown but other shapes are envisaged. The size and shape of the optimum disc may, after propagation through the waveguide, be related to the size and shape of the entrance pupil of the viewing system. This channeling of light only occurs due to the specific method of determining the hologram disclosed herein.

FIG. 10 shows an improved viewing system 1500, in accordance with the recognitions illustrated in FIGS. 9A and 9B.

The viewing system 1500 comprises a display device, which in this arrangement comprises an LCOS 1502. The LCOS 1502 is arranged to display a modulation pattern (or 'diffractive pattern') comprising the hologram and to project light that has been holographically encoded towards an eye 1505 that comprises a pupil that acts as an aperture 1504, a lens 1509, and a retina (not shown) that acts as a viewing plane. There is a light source (not shown) arranged to illuminate the LCOS 1502. The lens 1509 of the eye 1505 performs a hologram to image transformation.

The viewing system 1500 further comprises a waveguide 1508 positioned between the LCOS 1502 and the eye 1505. The projection distance in FIG. 10 may be relatively large. However, as described in relation to previous Figures, the presence of the waveguide 1508 enables all angular content from the LCOS 1502 to be received by the eye 1505, even at this relatively large projection distance. This is because the waveguide 1508 acts as a pupil expander, in a manner that has been described hereabove.

Additionally, in this arrangement, when the LCOS 1502 has been encoded in accordance with the methods described herein, the waveguide 1508 can be oriented at an angle with respect to the LCOS 1502 in order to establish a unique relationship, between the light from the LCOS 1502 and the virtual image that the viewer will perceive. The size, location, and position of the waveguide 1508 are configured to ensure that light from each part of the virtual image enters the waveguide 1508 and is guided along its elongate axis, bouncing between the substantially planar surfaces of the waveguide 1508. Each time the light reaches the second planar surface (nearest the eye 1505), some light is transmitted and some light is reflected.

FIG. 10 shows a total of nine "bounce" points, B0 to B8, along the length of the waveguide 1502. The reader will notice that the center of the image 1552 kept blank. FIG. 15C shows zeroth to ninth light "bounce" or reflection points, B0 to B8, within the waveguide. Although light relating to all points of the image (V1-V8) is transmitted out of the waveguide at each "bounce" from the second planar surface of the waveguide 1508, only the light from one of angular part of the image (e.g., light of one of V1 to V8) has a trajectory that enables it to reach the eye 1505, from each respective "bounce" point, B0 to B8. Moreover, light from a different angular part of the image, V1 to V8, reaches the eye 1505 from each respective "bounce" point. FIG. 10 shows light from all the different angular content being emitted at each "bounce" point, (depicted by a plurality of short arrows at each transmission point), but then only shows the optical path, to the eye 1505, of the respective angular content that will actually reach the eye 1505—and therefore will contribute to a respective portion of the virtual image that the viewer will perceive—from that respective part of the waveguide. For example, for the zeroth bounce, B0, the light that is transmitted by the waveguide 1508 is simply refracted and does not undergo any reflections therein. Light of the eighth sub-hologram, H8, reaches the eye from the zeroth bounce, B0. For the next bounce B1, the light that is transmitted by the waveguide 1502 undergoes one bounce therein, before transmission. Light from the seventh hologram, H7, reaches the eye from the next bounce, B1 This continues in sequence until the light that is transmitted by the waveguide 1508 at the final bounce, B8, has undergone eight bounces, before being transmitted and reaching the eye 1505, and comprises light encoded in accordance with the first hologram, H1.

In the example shown in FIGS. 10, light of only one image area reaches the eye from each bounce point. A spatial correlation between areas of the virtual image and their associated bounce point on the waveguide is therefore established—when the hologram is determined as described herein. In some other examples, there may be relatively small overlaps such that one region of the image comes from two adjacent transmission points, and thus is comprised within two adjacent discs of light that propagate from the waveguide, towards the viewing plane.

Thus, the recognitions made by the inventors, and the methods and arrangements described herein, can enable a diffractive pattern (or, light modulation pattern) comprising a hologram to be generated that, when displayed on an LCOS or other suitable display device, can enable the light to be emitted therefrom effectively in a plurality of 'discs', or ray bundles of light, each of which corresponds to (more specifically, encodes) a different respective part of the corresponding virtual image.

In overview, the present disclosure relates to calculation of a hologram that angularly distributes light (in the hologram domain) in accordance with position within the image and propagation of said light through a pupil expander providing a plurality of light propagation paths, wherein each light propagation path corresponds to a respective continuous region of the image. The present disclosure is further characterised by determining a first image component of an image and allocating more data processing resources to calculation of the hologram with respect to the first image component than a second image component of the image.

First Group of Embodiments: Sub-Areas of the Image

Figure 11:
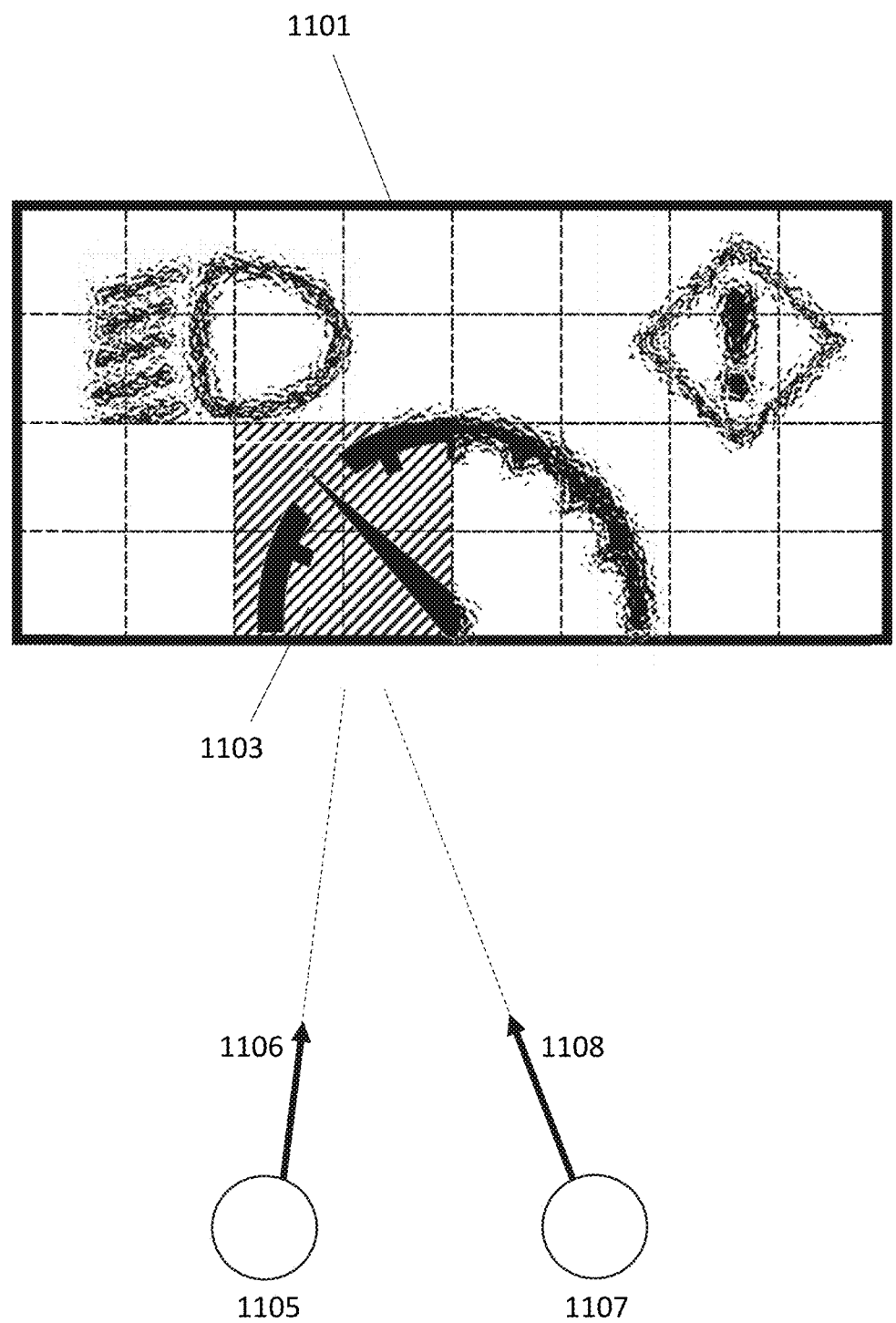
FIG. 11 shows a display area and example image for a first gaze direction.
Figure 12:
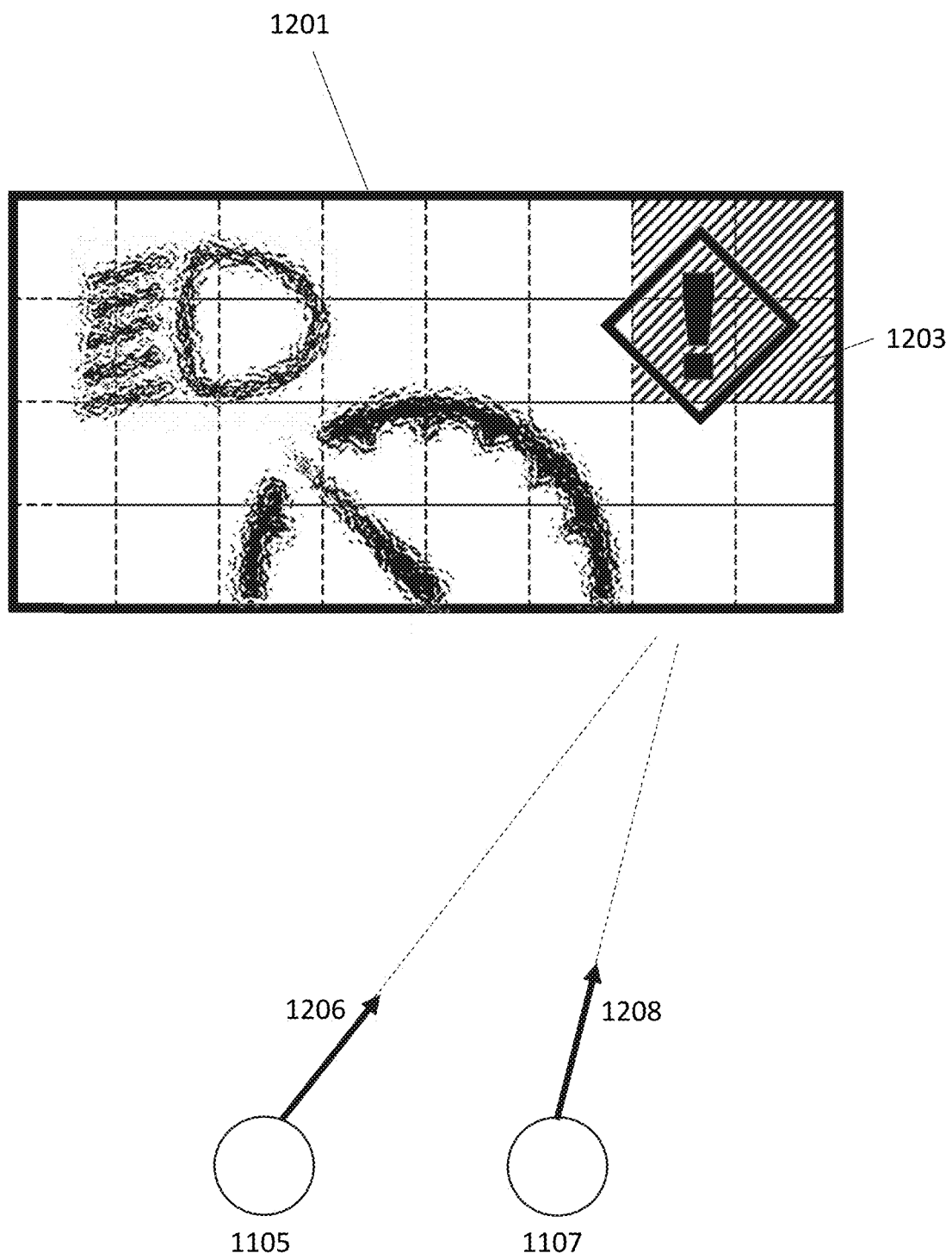
FIG. 12 shows the display area and example image for a second gaze direction.

In summary, FIGS. 11 and 12 show how a viewer's foveal region is computed to have high image quality while remainder of the image is computed for inferior quality (but sufficient for peripheral vision).

In more detail, FIG. 11 shows a display area 1101 in which an image is displayed. For example, the display area 1101 may be a display area of display system, such as a head-up display. In accordance with this disclosure, the image changes (e.g., in time). The image may change in real-time—for example, at video rate. Each image may be one image frame of a sequence of image frames. Each image may comprise image content. Each image may comprise a plurality of distinct image elements. By way of example only, FIG. 11 shows an image comprising three image elements. A first image element is representative of a speedometer. A second image element is representative of a vehicle headlamp indicator. A third image element is representative of a warning indicator. The first, second and third image elements are separated within the display area. That is, the first, second and third image elements are separated by clear space. In other words, the first, second and third image elements are disconnected. FIG. 11 also shows a first eye position 1105 and a second eye position 1107. A first eye disposed at the first eye position 1105 has a corresponding first eye gaze direction 1106 and a second eye disposed at the second eye position 1107 has a corresponding second eye gaze direction 1108. The reader will appreciate that the first eye and second eye are an example of a viewing system disposed on a viewing area or viewing plane. The viewing system may, of course, be a human viewer. The reader will also appreciate that a viewer may have foveal vision and peripheral vision. FIG. 11 highlights a first sub-area 1103 of the display area that corresponds to the viewer's foveal vision. The first sub-area 1103 corresponds to a first sub-area or first image component of the image. In this example, the first image component corresponds to one half of the first image element, the speedometer. FIG. 11 shows how the first eye gaze direction 1106 and second eye gaze direction are directed to the first sub-area 1103.

Notably, FIG. 11 illustrates how the image quality associated with the foveal vision area of the viewer—i.e., the first sub-area 1103—is greater than that of the peripheral vision area of the viewer—i.e., the rest of the display area 1101. In this example, the half of the first image element within the first sub-area 1103 is sharper/less blurred than the other half of the first image element that is outside the first sub-area 1103. For example, image contrast within the first sub-area may be greater than outside the first sub-area. Image content corresponding with the peripheral vision area of the viewer is less sharp/more blurred than image content corresponding with the foveal vision area of the viewer. FIG. 11 shows how the image quality of the second image element and third image element is relatively low.

In embodiments, each image is formed or reconstructed from a corresponding hologram. Each hologram may be determined or calculated from a source or target image. The reconstructed image should, of course, be a faithful copy or replica of the source or target image. However, the reader will appreciate that the hologram (which is a diffractive element having a complex structure) inherently affects the quality or accuracy of the reconstructed image and it can therefore be possible to considered or compare the "quality" of a hologram. By way of example only, the quality of an image reconstructed from a hologram may be assessed or even measured by a signal-to-noise ratio of the reconstructed image. However, the reader will appreciate that many other methods of measuring image quality are possible. In some embodiments, each hologram is calculated by a mathematical method requiring compute resources such as time or processing power. The image quality of the reconstructed image is determined, at least in part, by the amount or quantum of processing resources allocated to calculation of the hologram.

In accordance with the present disclosure, more processing resources are allocated to calculation of the hologram in respect of the foveal vision area than the peripheral vision area of the viewer. The method therefore comprises determining the first sub-area 1103 of the display area 1101 and selectively allocating processing resources based on such determination. In some embodiments, eye-tracking is used to determine the first sub-area 1103 of the display area 1101 but the reader will be familiar with other methods of determining a viewer's foveal vision area and therefore non-foveal vision area, or vice versa.

FIG. 11 may be representative of display of an image at a first time based on a first foveal vision area. FIG. 12 may be representative of display of the image at a second time based on a second foveal vision area, wherein the first time is different to the second time. The image shown in the display area 1101 of FIG. 11 may be reconstructed from a first hologram calculated based on the first foveal vision area 1103. The image shown in the display area 1201 of FIG. 12 may be reconstructed from a second hologram calculated based on the second foveal vision area 1203.

FIG. 12 largely corresponds to FIG. 11 but shows a first gaze direction 1206 and second gaze direction 1208 directed to a second foveal vision area 1203. The position of the second foveal vision area 1203 within the display area 1201 FIG. 12 is different to that of the first foveal vision area 1103 with the display area 1101 of FIG. 11. In this example, the second foveal vision area 1203 is largely aligned with the third image element. The image quality of the third image element is greater than that of the second image element and first image element. FIGS. 11 and 12 to the same target image. More specifically, the images of FIGS. 11 and 12 are reconstructions of the same target image. The first hologram and second hologram have been independently calculated from the same target image. However, in accordance with this disclosure, the allocation of processing resources used for calculation of the first hologram is different to the allocation of processing resources used for calculation of the second hologram. More processing resources are allocated in respect of the foveal vision area in order to produce an improvement in the image quality of the holographic reconstruction that is aligned with the foveal vision area. This is not as trivial as it may seem because every part of the hologram contributes to every part of the image. However, the configuration of hologram and pupil expander described herein provides a plurality of different light propagation paths, wherein each light propagation path corresponds to a respective continuous region of the image. The inventors recognised that their hologram calculation methods effectively allow different processing resources to be allocated to the different light propagation paths such that reconstruction quality may be a function of position within the image. This is not achievable with other holographic methods and brings about significant advantages particularly when the response of the viewing system to light is non-uniform.

FIG. 12 shows an optional further improvement in which the sub-area of the image which is allocated elevated processing resources extends beyond the foveal vision area. FIG. 12 shows how the sub-area extends to include the whole of an image feature—namely, the third image element—of the image partially contained in the foveal vision area. Effectively, the area of high image quality is extended. In other embodiments, consistent with FIG. 11, the sub-area extends no further than the corresponding foveal vision area.

The methods of hologram calculation disclosed herein effectively calculate a plurality of sub-holograms of each image and combine those sub-holograms to form the hologram for display. In some embodiments, allocating more data processing resources in relation to the first image component than the second image component comprises allocating more data processing resources in relation to calculation of a first sub-hologram corresponding to the first sub-area than a second sub-hologram corresponding to the second sub-area.

In some embodiments in which the hologram is a point cloud hologram, allocating more data processing resources in relation to the first sub-area than the second sub-area comprises using a higher density of point cloud data points in relation to the first sub-area than the second sub-area.

In other embodiments in which the hologram has been calculated using an iterative algorithm, allocating more data processing resources in relation to the first sub-area comprises performing more iterations of the algorithm in relation to the first sub-area than the second sub-area of the image.

In yet further embodiments, the first sub-hologram corresponding to the first sub-area is calculated by a point cloud method and the second sub-hologram corresponding to the second sub-area is calculated by an iterative algorithm.

Additional features, that are optional but achieve further advantages, are set out in the Summary above. These features are not repeated here because they are self-explanatory and do not therefore require a specific example or drawing in order to be fully understood.

In the embodiments described with reference to FIGS. 11 and 12, the image may be said to comprise a first image component and a second image component, wherein each image component is a different sub-area or sub-region of the image. That is, the image components are spatially components of the image—e.g., contiguous and/or continuous blocks of image pixels—that collectively make up the full image. However, in accordance with this disclosure, the image may be decomposed differently. That is, the "image components" may be different aspects or component elements of the image.

Second Group of Embodiments: Single-Color Components

In some embodiments, the image for reconstruction is a color image comprising a plurality of single-color image components—e.g., red, green and blue component—that collectively form the color image—e.g., by being superimposed on the display plane. For example, the color image may comprise a plurality of image pixels, wherein each image pixel comprises a red pixel value, a green pixel value and a blue pixel value. The reader will be very familiar with this concept. In these embodiments, the first image component is a first monochromatic image component of the image. In these embodiments, the second image component is a second monochromatic image component of the image. There may be a third monochromatic image component of the image, wherein the first image component corresponds to red, the second image component corresponds to green and the third image component corresponds to blue. Each single-color image component comprises a plurality of pixels.

In these embodiments, each single-color image component is processed independently. Each single-color image component may be considered an "image" in its own right. A hologram of each single-color image component is calculated. Each image may therefore give rise to at least a first hologram and second hologram. The first hologram may be suitably illuminated (e.g., with a laser diode providing red light) to form the first (red) image component. The second hologram may be suitably illuminated (e.g., with a laser diode providing green light) to for the second (green) image component. The spatially modulated light of each color is propagated to the viewing system by the pupil expander. By way of example only, the single-color image components may be reconstructed to form the full color image using a scheme such as those referred to herein as frame sequential color and spatially separated colors.

The reader will appreciate that there may be circumstances in which it is beneficial to allocate more hologram calculation resources in relation to one single-color component of the image than another.

For example, in some embodiments, the viewing system or viewer is more sensitive to light corresponding to the first monochromatic image component than the second monochromatic image component. That is, the viewing system is more responsive (e.g., provides a greater output) to light having a wavelength corresponding to the first monochromatic image component than light having a wavelength corresponding to the second monochromatic image component. It may be advantageous to prioritise calculation of the hologram that will elicit the greatest response from the viewing system. For example, when the viewing system is a human viewer, it is advantageous to spend more time or process more data points in relation to calculating the hologram that will give rise to the green image rather than the red or blue image. These embodiments achieve the technical advancement of improving the image quality that is perceived by the viewing system.

In other embodiments, it is determined that the first monochromatic image component is visually more dominant in the image than the second monochromatic image component. Because of this determination, it is advantageous to prioritise calculation of the hologram of the first monochromatic image component than the second monochromatic image component. These embodiments also achieve the technical advancement of improving the image quality that is perceived by the viewing system.

In yet further embodiments, a background area of the image is identified (for example, by known image processing/analysis techniques) and a parameter of the background area of the image is identified such as a color or a generally dominant color such as a most frequent color or an average color. In these embodiments, it is determined that one monochromatic image component is more likely to be visible (e.g., over the background) than another monochromatic image component. This determination may be based on the identified parameter of the background of the image. This determination may comprise a measurement of contrast between the parameter of the background (e.g., color) and the corresponding parameter of the monochromatic image component. In accordance with this disclosure, more data processing resources are allocated to calculation of the hologram corresponding to the monochromatic image component of the plurality of monochromatic image components that is deemed or determined to be more visible over the background.

In other embodiments, the color balance of the reconstructed polychromatic image is changed in a region of the image corresponding to an non-foveal vision area identified by e.g., eye, head or gaze-tracking the viewer. For example, this may include moving the color balance towards 500 nm and/or decreasing the intensity of any image light having a wavelength greater than 600 nm.

The improved methods and arrangements described herein can be implemented in a variety of different applications and viewing systems. For example, they may be implemented in a head-up-display (HUD). Although virtual images, which require the eye to transform received modulated light in order to form a perceived image, have generally been described herein, the improved methods and arrangements described herein can be applied to real images.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. The holographic projection system of the present disclosure may be used to provide an improved head-up display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

In the second group of embodiments disclosed, the holographic reconstruction is color. In some embodiments, an approach known as spatially-separated colors, "SSC", is used to provide color holographic reconstruction. In other embodiments, an approach known as frame sequential color, "FSC", is used.

The method of SSC uses three spatially-separated arrays of light-modulating pixels for the three single-color holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-color image is sub-optimal because only a subset of the available light-modulating pixels is used for each color. Accordingly, a relatively low-resolution color image is provided.

The method of FSC can use all pixels of a common spatial light modulator to display the three single-color holograms in sequence. The single-color reconstructions are cycled (e.g., red, green, blue, red, green, blue, etc.) fast enough such that a human viewer perceives a polychromatic image from integration of the three single-color images. An advantage of FSC is that the whole SLM is used for each color. This means that the quality of the three color images produced is optimal because all pixels of the SLM are used for each of the color images. However, a disadvantage of the FSC method is that the brightness of the composite color image is lower than with the SSC method—by a factor of about 3—because each single-color illumination event can only occur for one third of the frame time. This drawback could potentially be addressed by overdriving the lasers, or by using more powerful lasers, but this requires more power resulting in higher costs and an increase in the size of the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A method of reconstructing an image from a hologram, the method comprising:
    receiving the image for display within a display area of a display system, wherein the display area is viewable from a viewing area spatially separated therefrom;
    determining a first image component of the image;
    calculating an angularly-channelized hologram of the image, wherein when illuminated, the angularly-channelized hologram produces spatially modulated light divided into a plurality of hologram channels, and wherein each hologram channel is defined by a range of light ray angles corresponding to a respective continuous region of the image;

displaying the angularly-channelized hologram on a display device and spatially modulating light in accordance with the displayed angularly-channelized hologram; and propagating the spatially modulated light through a pupil expander arranged to provide a plurality of different light propagation paths for the spatially modulated light from the display device to the viewing area, wherein each light propagation path corresponds to a respective continuous region of the image based on the hologram channels produced by the angularly-channelized hologram;

wherein the method comprises allocating more data processing resources to calculation of the angularly-channelized hologram with respect to the first image component than a second image component of the image, and wherein the first image component corresponds to a first sub-area of the image within a foveal vision area of a viewer, and wherein and the second image component corresponds to a second sub-area of the image within a peripheral vision area of the viewer.

2. The method of claim 1, wherein calculation of the angularly-channelized hologram comprises calculating a plurality of sub-holograms, wherein each sub-hologram corresponds to a different one of the respective continuous regions of the image, wherein allocating more data processing resources in relation to the first image component than the second image component comprises allocating more data processing resources in relation to calculation of a first sub-hologram corresponding to the first sub-area than a second sub-hologram corresponding to the second sub-area, and wherein the first sub-hologram corresponding to the first sub-area is calculated using a point cloud method and the second sub-hologram corresponding to the second sub-area is calculated using an iterative method.

3. The method of claim 1, wherein the angularly-channelized hologram is a point cloud hologram, and wherein allocating more data processing resources in relation to the first sub-area than the second sub-area comprises using a higher density of point cloud data points in relation to the first sub-area than the second sub-area.

4. The method of claim 1, wherein calculating the angularly-channelized hologram comprises executing an iterative algorithm, and wherein allocating more data processing resources in relation to the first sub-area comprises performing more iterations of the algorithm in relation to the first sub-area than the second sub-area of the image.

5. The method of claim 4, wherein the image area is viewed from the viewing area by a viewing system comprising an entrance pupil, a lens, and a light sensor, and wherein the iterative algorithm comprises:

a first stage comprising determining a first complex light field at the entrance pupil of the viewing system, wherein the first complex light field results from the propagation of light from the display device along at least one light propagation path of the pupil expander and cropping in accordance with the entrance pupil of the viewing system;

a second stage comprising determining a second complex light field at the light sensor of the viewing system, wherein the second complex light field results from the propagation of light of the first complex light field from the entrance pupil through the lens of the viewing system and modification of an amplitude component in accordance with the image;

a third stage comprising determining a third complex light field at the entrance pupil, wherein the third complex light field results from a reverse propagation of light of the second complex light field from the sensor back through the lens and cropping in accordance with the entrance pupil;

a fourth stage comprising determining a fourth complex light field at a display plane, wherein the fourth complex light field results from the reverse propagation of light of the third complex light field back along the at least one light propagation of the pupil expander and cropping in accordance with the display device; and extracting a hologram from the fourth complex light field.

6. The method of claim 5, wherein the at least one light propagation path is only one of a plurality of light propagation paths provided by the pupil expander, and wherein the first to fourth stages are carried out for each light propagation path of the plurality of light propagation paths in order to extract a sub-hologram for each light propagation path, wherein a plurality of sub-holograms corresponding to the plurality of light propagation paths are combined in order to form the hologram for display on the display device.

7. The method of claim 5, wherein the first to fourth stages are iteratively repeated for each light propagation path before the step of extracting a sub-hologram from a final iteration.

8. The method of claim 1, further comprising at least one of (i) repeating the method after determining a change regarding at least one of a size or position within the image of the first sub-area, or (ii) recalculating the angularly-channelized hologram with respect to the first image component, but not the second image component, after determining a change regarding at least one of the size or position within the image of the first sub-area.

9. The method of claim 1, wherein the first sub-area of the image is determined by determining a corresponding first sub-area of the display area, wherein the first sub-area of the display area corresponds to a foveal vision area of a viewing system at the viewing area, wherein the second sub-area of the image is determined by determining a corresponding second sub-area of the display area, and wherein the second sub-area of the display area corresponds to a peripheral vision area of the viewing system.

10. The method of claim 9, wherein at least one of (i) the first sub-area of the image extends no further than the corresponding foveal vision area, or (ii) the first sub-area of the image extends beyond the corresponding foveal vision area to include the whole of an image feature of the image partially contained in the foveal vision area.

11. The method of claim 9, further comprising one or more of eye, head, or gaze-tracking of the viewing system to determine the first sub-area of the display area, and wherein the method further comprises (i) determining a region of the image corresponding to a blind spot of a viewer based on one or more of the eye, head, or gaze-tracking and (ii) processing the image prior to calculating the angularly-channelized hologram in order to remove image content corresponding to the blind spot of the viewer.

12. The method of claim 11, further comprising at least one of (i) determining a rate of change of at least one of eye or head position or gaze direction, and reducing the data processing resources allocated to calculating the angularly-channelized hologram if a rate of change of at least one of the eye or head position or gaze direction is greater than a stored value or (ii) predicting at least one of a future eye or head position or gaze direction based on stored data relating to the same in order that more data processing resources may be allocated to calculating the angularly-channelized hologram.

13. The method of claim 11, wherein the display device has a variable display rate, and wherein the method further comprises updating the display device more quickly if the rate of change of at least one of eye or head position or gaze direction is greater than a stored value.

14. The method of claim 1, further comprising increasing an intensity of the first sub-area of the image relative to the second sub-area prior to calculating the angularly-channelized hologram of the image.

15. A light engine arranged to reconstruct an image from a hologram, wherein the light engine comprises:
   an image processor arranged to receive an image for display within a display area and determine a first image component of the image, wherein the display area is viewable from a viewing area spatially separated therefrom;
   a hologram engine arranged to calculate an angularly-channelized hologram of the image, wherein when illuminated, the angularly-channelized hologram produces spatially modulated light divided into a plurality of hologram channels, and wherein each hologram channel is defined by a range of light ray angles corresponding to a respective continuous region of the image;
   a display device arranged to display the angularly-channelized hologram and spatially modulate light in accordance with the displayed angularly-channelized hologram; and
   a pupil expander arranged to receive the spatially modulated light from the display device and propagate the spatially modulated light therethrough to provide a plurality of different light propagation paths for the spatially modulated light from the display device to the viewing area, wherein each light propagation path corresponds to a respective continuous region of the image based on the hologram channels produced by the angularly-channelized hologram,
   wherein the light engine is arranged to allocate more data processing resources to calculation of the angularly-channelized hologram with respect to the first image component than a second image component of the image, and wherein the first image component corresponds to a first sub-area of the image within a foveal vision area of a viewer, and wherein and the second image component corresponds to a second sub-area of the image within a peripheral vision area of the viewer.

\* \* \* \* \*